(12) United States Patent
Kim et al.

(10) Patent No.: US 9,363,805 B2
(45) Date of Patent: Jun. 7, 2016

(54) METHOD AND APPARATUS FOR TRANSMITTING/RECEIVING DOWNLINK CONTROL CHANNEL IN WIRELESS COMMUNICATION SYSTEM

(75) Inventors: Hakseong Kim, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 14/008,450

(22) PCT Filed: Apr. 3, 2012

(86) PCT No.: PCT/KR2012/002488
§ 371 (c)(1),
(2), (4) Date: Sep. 27, 2013

(87) PCT Pub. No.: WO2012/138097
PCT Pub. Date: Oct. 11, 2012

(65) Prior Publication Data
US 2014/0016596 A1  Jan. 16, 2014

Related U.S. Application Data

(60) Provisional application No. 61/471,181, filed on Apr. 3, 2011.

(51) Int. Cl.
*H04W 4/00* (2009.01)
*H04W 72/04* (2009.01)
(Continued)

(52) U.S. Cl.
CPC ........... *H04W 72/042* (2013.01); *H04L 1/0031* (2013.01); *H04L 1/0061* (2013.01); *H04L 1/0073* (2013.01); *H04L 5/001* (2013.01); *H04L 5/0053* (2013.01); *H04L 5/0094* (2013.01); *H04B 7/024* (2013.01); *H04B 7/0417* (2013.01);
(Continued)

(58) Field of Classification Search
CPC .. H04L 1/0031; H04W 72/04; H04W 72/042; H04W 72/006; H04W 84/047
See application file for complete search history.

(56) References Cited

U.S. PATENT DOCUMENTS

2009/0245193 A1* 10/2009 Gaal et al. ..................... 370/329
2009/0316814 A1  12/2009 Seo et al.
(Continued)

FOREIGN PATENT DOCUMENTS

GB          2469689 A     10/2010
WO    WO 2010/123331 A2  10/2010

*Primary Examiner* — Man Phan
*Assistant Examiner* — Ryan Kavleski
(74) *Attorney, Agent, or Firm* — Birch, Stewart, Kolasch & Birch, LLP

(57) ABSTRACT

The present invention relates to a wireless communication system, and more particularly, discloses a method and a downlink reception apparatus, in which at least one cell is set, for transmitting and receiving a downlink control channel. According to one embodiment of the present invention, the method for receiving the physical downlink control channel (PDCCH) by the downlink reception apparatus in which at least one cell is set, comprises: a step of receiving a virtual resource block (VRB) set setting information for a potential PDCCH transmission; and a step of monitoring the VRB set and demodulating the PDCCH, wherein information on the VRB set, with regard to a cell for which PDCCH non-crossed interleaving is set or to a cell for which the PDCCH demodulation is set, based on the downlink reception apparatus-specific reference signal, can be commonly defined for a first slot and a second slot in a downlink subframe.

13 Claims, 31 Drawing Sheets

(51) Int. Cl.
*H04L 5/00* (2006.01)
*H04L 1/00* (2006.01)
*H04L 27/26* (2006.01)
*H04B 7/02* (2006.01)
*H04B 7/04* (2006.01)

(52) U.S. Cl.
CPC ......... *H04L 27/2633* (2013.01); *H04L 27/2636* (2013.01)

(56) References Cited

U.S. PATENT DOCUMENTS

| | | |
|---|---|---|
| 2010/0118800 A1 | 5/2010 | Kim et al. |
| 2011/0064164 A1 | 3/2011 | Seo et al. |
| 2011/0177822 A1* | 7/2011 | Takanashi ..................... 455/450 |
| 2011/0249640 A1* | 10/2011 | Soong et al. ................... 370/329 |
| 2012/0044921 A1 | 2/2012 | Chung et al. |
| 2012/0275400 A1* | 11/2012 | Chen et al. .................... 370/329 |
| 2013/0039284 A1* | 2/2013 | Marinier et al. .............. 370/329 |
| 2013/0223402 A1* | 8/2013 | Feng et al. .................... 370/330 |

* cited by examiner

FIG. 5
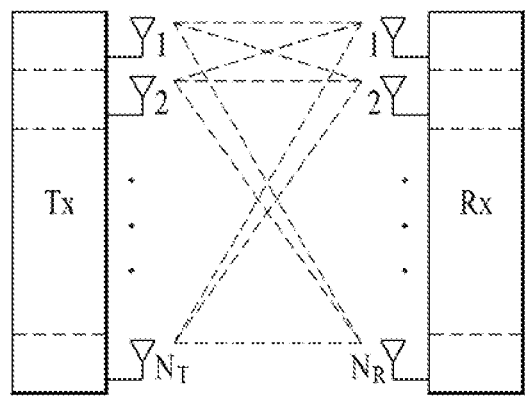
(a)
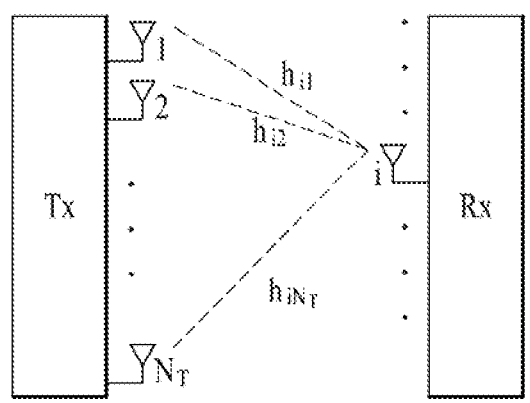
(b)

FIG. 6
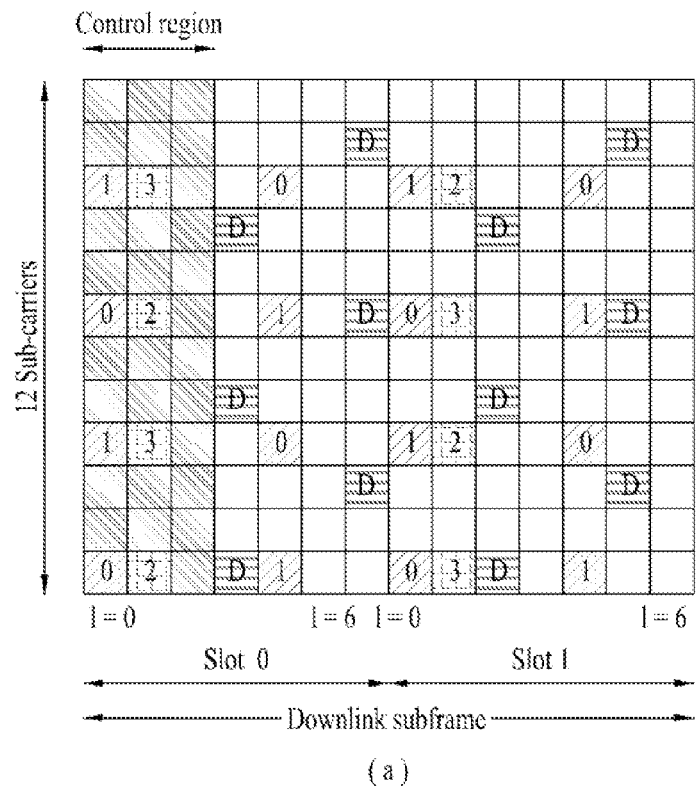
(a)
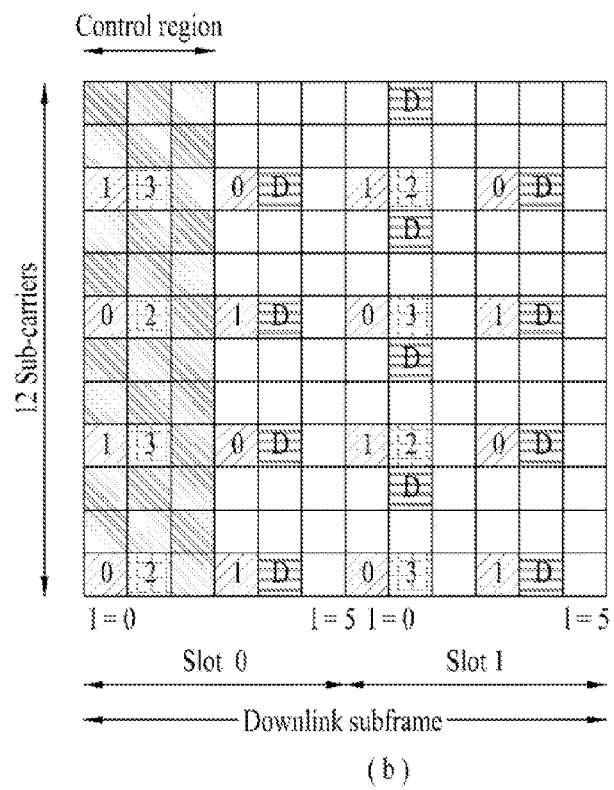
(b)

FIG. 13
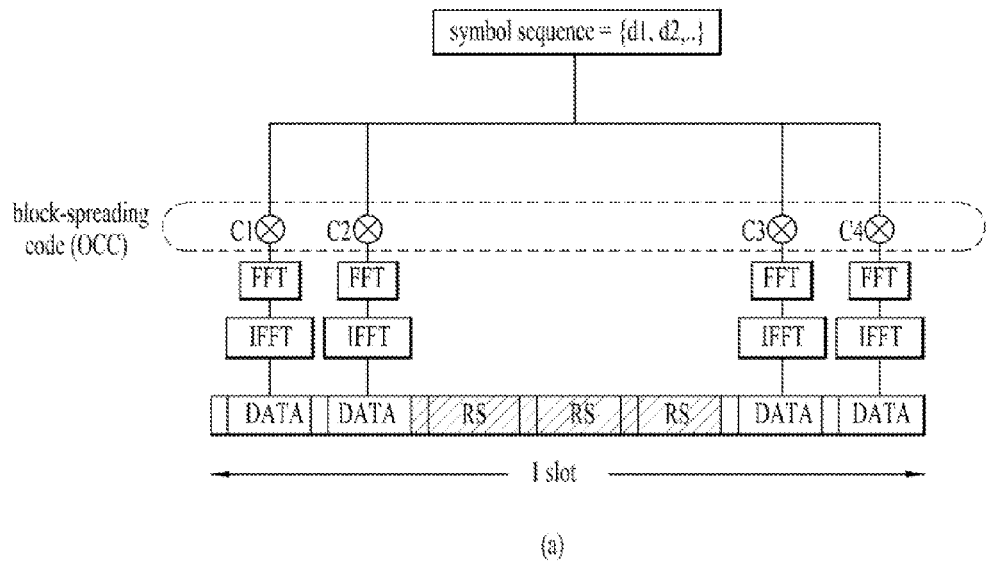
(a)
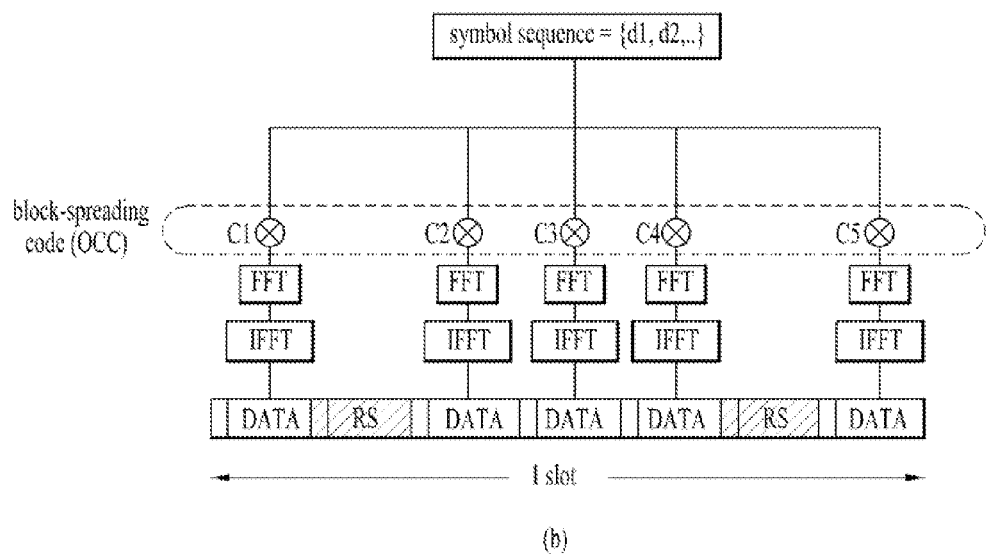
(b)

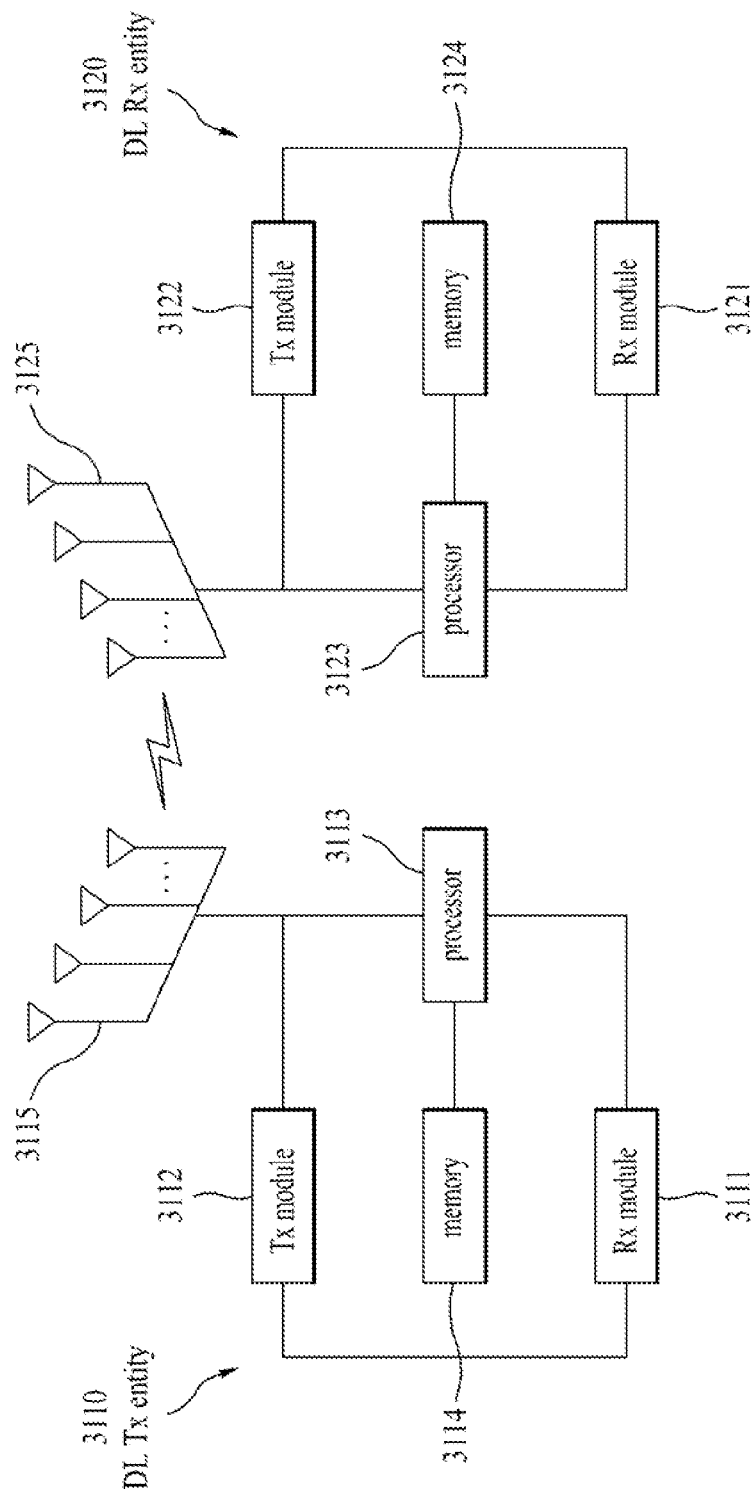

METHOD AND APPARATUS FOR TRANSMITTING/RECEIVING DOWNLINK CONTROL CHANNEL IN WIRELESS COMMUNICATION SYSTEM

CROSS REFERENCE TO RELATED APPLICATIONS

This application is the National Phase of PCT/KR2012/002488 filed on Apr. 3, 2012, which claims priority under 35 U.S.C. 119(e) to U.S. Provisional Application No. 61/471,181 filed on Apr. 3, 2011, all of which are incorporated by reference herein in its entirety.

TECHNICAL FIELD

The following description relates to a wireless communication system, and more specifically, to a method and apparatus for transmitting/receiving a downlink control channel for a downlink reception apparatus in which one or more cells are configured.

BACKGROUND ART

A downlink reception apparatus can be provided with scheduling information for uplink transmission and/or downlink reception through a downlink control channel. A scheme of mapping a physical downlink control channel (PDCCH) transmitted in a specific region of a downlink subframe to a physical resource and the position of the PDCCH are defined in a serving cell for a downlink reception apparatus defined in a conventional wireless communication system.

To meet demand for increased wireless communication system throughput, carrier aggregation may be used. When carrier aggregation is applied, a downlink control channel may be transmitted on a corresponding carrier or other carriers.

DISCLOSURE

Technical Problem

To provide control information about a relay or to meet demand for a downlink control channel that does not correspond to existing PDCCHs, introduction of a new PDCCH transmitted in a physical resource position different from PDCCHs defined in conventional wireless communication systems is under discussion. When a new PDCCH is introduced to a wireless communication system to which carrier aggregation is applied, it is necessary to newly define a scheme of mapping the new PDCCH to a physical resource and the position of the new PDCCH. Furthermore, an efficient signaling method for signaling the position of a physical resource to which the new PDCCH is mapped is needed.

An object of the present invention devised to solve the problem lies in a method for determining a scheme of mapping a new PDCCH to a physical resource and the position of the PDCCH correctly and efficiently. Another object of the present invention is to provide an efficient signaling method for signaling the position of a physical resource to which a new PDCCH is mapped.

The technical problems solved by the present invention are not limited to the above technical problems and those skilled in the art may understand other technical problems from the following description.

Technical Solution

The object of the present invention can be achieved by providing a method for receiving a physical downlink control channel (PDCCH) by a downlink receiver for which one or more cells are set, the method including: receiving information on configuration of a virtual resource block (VRB) set for potential PDCCH transmission; and monitoring the VRB set and demodulating the PDCCH, wherein information on the VRB set, with regard to a cell for which PDCCH non-cross-interleaving is set or to a cell for which PDCCH demodulation based on a downlink receiver-specific reference signal is set, is commonly defined for a first slot and a second slot in a downlink subframe.

In another aspect of the present invention, provided herein is a method for transmitting a PDCCH by a downlink transmitter to a downlink receiver for which one or more cells are set, the method including: transmitting information on configuration of a VRB set for potential PDCCH transmission; and transmitting the PDCCH using the VRB set, wherein information on the VRB set, with regard to a cell for which PDCCH non-cross-interleaving is set or to a cell for which PDCCH demodulation based on a downlink receiver-specific reference signal is set, is commonly defined for a first slot and a second slot in a downlink subframe.

In another aspect of the present invention, provided herein is a downlink receiver receiving a PDCCH, for which one or more cells are set, the downlink receiver including: a reception module for receiving a downlink signal from a downlink transmitter; a transmission module for transmitting an uplink signal to the downlink transmitter; and a processor controlling the downlink receiver including the reception module and the transmission module, wherein the processor is configured to receive information on configuration of a VRB set for potential PDCCH transmission through the reception module, to monitor the VRB set and to demodulate the PDCCH, wherein information on the VRB set, with regard to a cell for which PDCCH non-cross-interleaving is set or to a cell for which PDCCH demodulation based on a downlink receiver-specific reference signal is set, is commonly defined for a first slot and a second slot in a downlink subframe.

In another aspect of the present invention, provided herein is a downlink transmitter transmitting a PDCCH to a downlink receiver for which one or more cells are set, the downlink transmitter including: a reception module for receiving an uplink signal from a downlink receiver; a transmission module for transmitting a downlink signal to the downlink receiver; and a processor controlling the downlink transmitter including the reception module and the transmission module, wherein the processor is configured to transmit information on configuration of a VRB set for potential PDCCH transmission through the transmission module and to transmit the PDCCH using the VRB set through the transmission module, wherein information on the VRB set, with regard to a cell for which PDCCH non-cross-interleaving is set or to a cell for which PDCCH demodulation based on a downlink receiver-specific reference signal is set, is commonly defined for a first slot and a second slot in a downlink subframe.

The following may be commonly applied to the above-described embodiments of the present invention.

Information on configuration of the VRB set, with regard to a plurality of cells for which PDCCH non-cross-interleaving is set or to a plurality of cells for which PDCCH demodulation based on a downlink receiver-specific reference signal is set, may be commonly defined for the plurality of cells.

Information on configuration of the VRB set, with regard to a cell for which PDCCH non-cross-interleaving is set or to a cell for which PDCCH demodulation based on a cell-specific reference signal is set, may be respectively defined for the first slot and the second slot in the downlink subframe.

Information on configuration of the VRB set, with regard to a plurality of cells for which PDCCH non-cross-interleaving is set or to a plurality of cells for which PDCCH demodulation based on a cell-specific reference signal is set, may be defined such that information on a VRB set corresponding to the first slot is commonly defined for the plurality of cells and information on a VRB set corresponding to the second slot is commonly defined for the plurality of cells.

Downlink assignment scheduling information may be transmitted through a PDCCH transmitted in the first slot of the downlink subframe and uplink grant scheduling information may be transmitted through a PDCCH transmitted in the second slot of the downlink subframe.

The VRB set with respect to a cell for which PDCCH non-cross-interleaving is set or a cell for which PDCCH demodulation based on a downlink receiver-specific reference signal is set may be mapped to a physical resource block (PRB) set in the corresponding cell.

The VRB set with respect to a cell for which PDCCH non-cross-interleaving is set or a cell for which PDCCH demodulation based on a cell-specific reference signal is set may be mapped to a PRB set in a predetermined cell.

The VRB set for the one or more cells may be mapped to a PRB set in a predetermined cell.

The predetermined cell may be a primary cell (PCell).

The VRB set may be a search space for the PDCCH.

The VRB set configuration information may be transmitted through signaling of a layer higher than a physical layer.

The PDCCH may correspond to orthogonal frequency division multiplex (OFDM) symbols of the downlink subframe, other than first N (N≤3) OFDM symbols.

The PDCCH may be an R-PDCCH or an e-PDCCH.

Above description and the following detailed description of the present invention are exemplary and are for the purpose of additional explanation of the claims.

Advantageous Effects

According to the present invention, it is possible to determine a scheme of mapping a new PDCCH to a physical resource and the position of the PDCCH correctly and efficiently. In addition, according to the present invention, it is possible to provide an efficient signaling method for signaling the position of a physical resource to which a new PDCCH is mapped.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a configuration of a wireless communication system having multiple antennas;
FIG. 6 illustrates a downlink reference signal;
FIG. 13 illustrates a PUCCH channel structure using block spreading;
FIG. 31 illustrates configurations of a downlink transmission apparatus and a downlink reception apparatus according to the present invention.

BEST MODE

Figure 1:
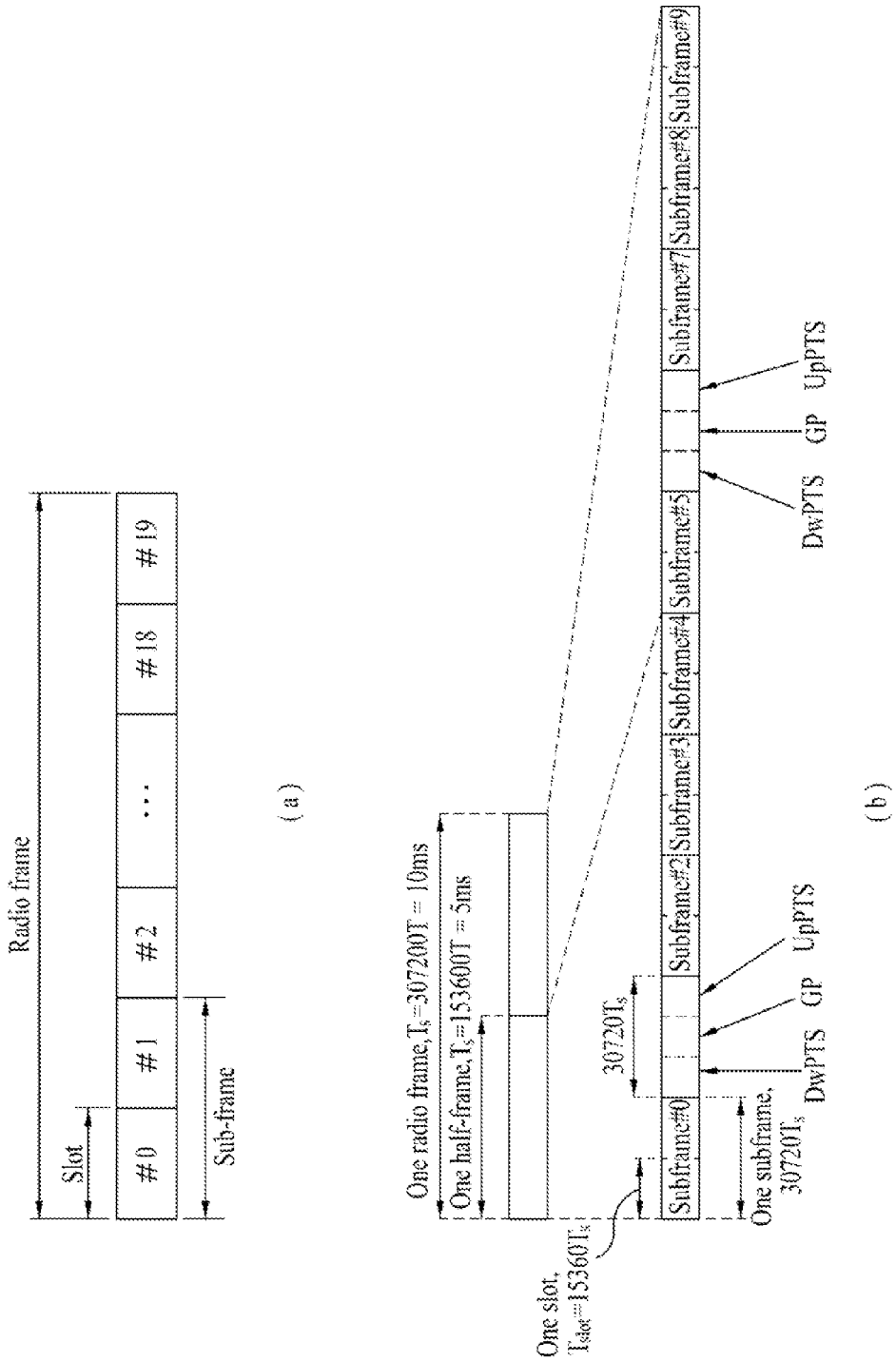
FIG. 1 illustrates a radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A radio frame structure of 3GPP LTE will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and includes a plurality of resource blocks (RBs) in the frequency domain. Because 3GPP LTE adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
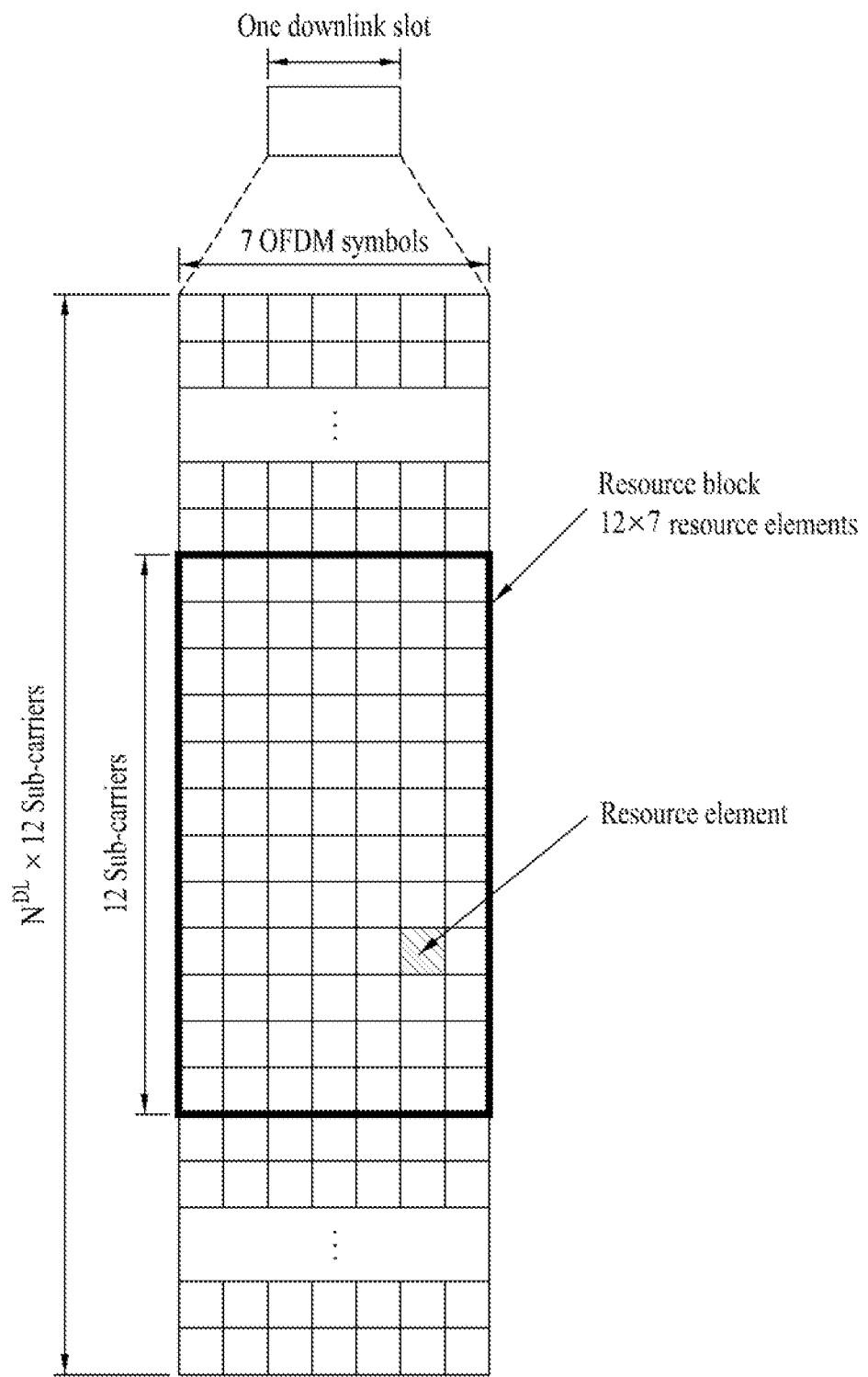
FIG. 2 illustrates a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
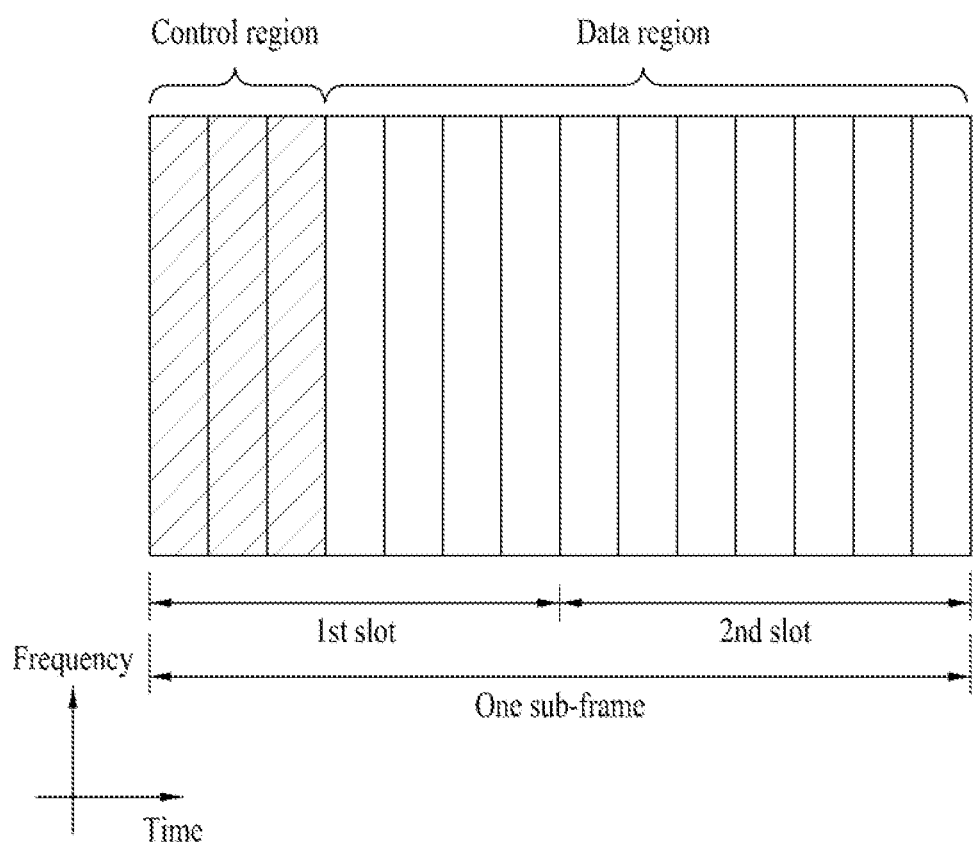
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
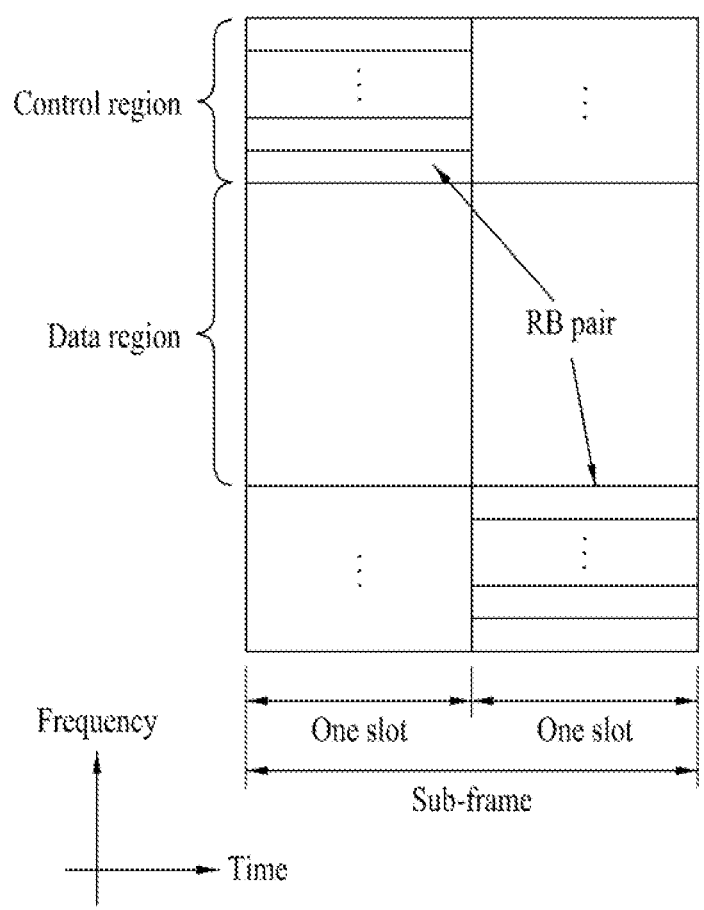
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s}[s_1, s_2, \ldots, s_{N_T}]^T = [Ps_1, Ps_2, \ldots, Ps_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas. The channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

A downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal. An RS related to feedback of channel state information (CSI) such as CQI/PMI/RI may be defined as a CSI-RS.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal (DMRS).

FIG. 6 illustrates a pattern of mapping a CRS and a DRS defined in 3GPP LTE (e.g. release-8) to a downlink resource block (RB) pair. A downlink RB pair as a reference signal mapping unit may be represented as one subframe in the time domain×12 subcarriers in the frequency domain. That is, an RB pair has a length of 14 OFDM symbols in the case of normal CP (FIG. 6(a)) and has a length of 12 OFDM symbols in the case of extended CP (FIG. 6(b)) in the time domain.

FIG. 6 shows RS positions in RB pairs in a system in which an eNB supports 4 transmit antennas. In FIG. 6, REs indicated by '0', '1', '2' and '3' respectively represent CRS positions with respect to antenna port indices 0, 1, 2 and 3. An RE indicated by 'D' represents a DRS position.

CRSs will be described in detail hereinafter.

The CRS is used to estimate a channel of a physical antenna and can be commonly received by all UEs in a cell. The CRS is distributed in the entire band. The CRS can be used for CSI acquisition and data demodulation.

The CRS is defined in various forms according to antenna configuration of a transmitter (eNB). 3GPP LTE (e.g. release-8) supports various antenna configurations and a downlink signal transmitter (eNB) may have three antenna configurations of a single antenna, 2 Tx antennas and 4 Tx antennas. When the eNB performs single antenna transmission, an RS for a single antenna port is provided. When the eNB performs 2-antenna transmission, RSs for 2 antenna ports are provided through time division multiplexing (TDM) and/or frequency division multiplexing (FDM). That is, the R0Ss for the 2 antenna ports can be discriminated from each other by being present in different time resources and/or different frequency resources. Furthermore, when the eNB performs 4-antenna transmission, RSs for 4 antenna ports are provided through TDM/FDM. Channel information estimated by a signal receiver (UE) using the CRS can be used to demodulate data transmitted through single antenna transmission, transmit diversity, closed-loop spatial multiplexing, open-loop spatial multiplexing, multi-user MIMO (MU-MIMO), etc.

In case of multi-antenna transmission, when an RS is transmitted through a specific antenna port, the RS is transmitted in an RE designated according to RS pattern and no signal is transmitted in REs designated for other antenna ports. A rule of mapping the CRS to an RB conforms to Equation 12.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k is a subcarrier index, l is a symbol index, p is an antenna port index. In addition, $N_{symb}^{DL}$ denotes the number of OFDM symbols of a downlink slot, $N_{RB}^{DL}$ denotes the number of RBs allocated to downlink, $n_s$ is a slot index, $N_{ID}^{cell}$ is a cell ID and mod denotes modulo operation. An RS position in the frequency domain depends on $V_{shift}$. Since $V_{shift}$ depends on cell ID, the RS position has different frequency shift values per cell.

Specifically, to improve channel estimation performance through the CRS, a CRS position in the frequency domain is shifted per cell such that cells have different frequency shift values. For example, when an RS is present for every 3 subcarriers, the RS can be present in a subcarrier 3k in a cell and in a subcarrier 3k+1 in another cell. For an antenna port, an RS is distributed at an interval of 6 REs (i.e. 6 subcarriers) in the frequency domain and spaced apart from REs in which an RS for another antenna port is present in the frequency domain.

Power boosting may be applied to the CRS. Power boosting is a method for transmitting an RS with higher power using power corresponding to REs of an OFDM symbol, other than REs allocated for the RS.

An RS is disposed at a specific interval starting from symbol index (l) 0 of each slot in the time domain. The interval is defined based on CP length. RSs are present in symbols corresponding to symbol indices 0 and 4 in a slot in the case of normal CP and present in symbols corresponding to symbol indices 0 and 3 in the slot in the case of extended CP. Only RSs for up to 2 antenna ports are defined in a single OFDM symbol. Accordingly, in the case of 4-Tx antenna transmission, RSs for antenna ports 0 and 1 are present in symbols corresponding to symbol indices 0 and 4 (symbol indices 0 and 3 in the extended CP case) in a slot and RSs for antenna ports 2 and 3 are present in a symbol corresponding to symbol index 1 in the slot. However, the frequencies of the RSs for antenna ports 2 and 3 are switched in the second slot.

To provide higher spectral efficiency than 3GPP LTE (e.g. LTE release-8 or release-9), a system (e.g. LTE-A (Advanced)) having an extended antenna configuration may be designed. The extended antenna configuration may be an 8Tx antenna configuration. The system having the extended antenna configuration needs to support UEs operating in a conventional antenna configuration. That is, the system needs to support backward compatibility. Accordingly, it is necessary to support a reference signal pattern according to the conventional antenna configuration and to design a new reference signal pattern for an additional antenna configuration. Here, when a CRS for a new antenna port is added to a system having a conventional antenna configuration, RS overhead abruptly increases, decreasing throughput. In consideration of this, LTE-A evolved from 3GPP LTE introduces an additional RS (CSI-RS) for CSI measurement for a new antenna port.

A DRS will now be described in detail hereinafter.

The DRS (or UE-specific RS) is used for data demodulation. A precoding weight used for a specific UE is used for an RS in multi-antenna transmission such that the UE can estimate an equivalent channel obtained by combining the precoding weight transmitted through each Tx antenna and a transport channel when receiving the RS.

3GPP LTE (e.g. release-8) supports transmission through up to 4 Tx antennas and defines a DRS for rank-1 beamforming. The DRS for rank-1 beamforming is also used as an RS for antenna port index 5. A rule of mapping the DRS to an RB conforms to Equations 13 and 14. Equation 13 relates to the normal CP case and Equation 14 relates to the extended CP case.

$$k = (k') \bmod N_{sc}^{RB} + N_{sc}^{RB} \cdot n_{PRB} \qquad \text{[Equation 13]}$$

$$k' = \begin{cases} 4m' + v_{shift} & \text{if } l \in \{2,3\} \\ 4m' + (2 + v_{shift}) \bmod 4 & \text{if } l \in \{5,6\} \end{cases}$$

$$l' = \begin{cases} 3 & l' = 0 \\ 6 & l' = 1 \\ 2 & l' = 2 \\ 5 & l' = 3 \end{cases}$$

$$l' = \begin{cases} 0,1 & \text{if } n_s \bmod 2 = 0 \\ 2,3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1,2 & \text{if } n_s \bmod 2 = 1 \end{cases}$$

$$m' = 0,1, \ldots, 4N_{RB}^{PDSCH} - 1$$

$$v_{shift} = N_{ID}^{cell} \bmod 3$$

In Equations 13 and 14, k is a subcarrier index, l is a symbol index, p is an antenna port index. In addition, $N_{SC}^{RB}$ denotes an RB size in the frequency domain and is represented by the number of subcarriers, $n_{PRB}$ denotes a PRB number, $N_{RB}^{PDSCH}$ denotes the bandwidth of an RB in which a corresponding PDSCH is transmitted, $n_s$ is a slot index, $N_{ID}^{cell}$ is a cell ID and mod denotes modulo operation. An RS position in the frequency domain depends on $V_{shift}$. Since $V_{shift}$ depends on cell ID, the RS position has different frequency shift values per cell.

LTE-A, the next generation of 3GPP LTE, considers MIMO, multi-cell transmission, enhanced MU-MIMO, etc. of a high order and also considers DRS based data demodulation in order to support efficient RS operation and an improved transmission scheme. That is, a DRS for two or more layers can be defined to support data transmission through an added antenna, separately from the DRS (antenna port index 5) for rank-1 beamforming, defined in 3GPP LTE (e.g. release-8).

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial modulation and coding scheme (MCS), initial power control for data transmission, timing advance, and frequency non-selective scheduling (in which a transmitter selectively allocates a frequency resource to the first slot of a subframe and then pseudo-randomly hops to another frequency resource in the second slot of the subframe).

The SRS may be used for measuring downlink channel quality on the assumption of the reciprocity of a radio channel between the downlink and the uplink. This assumption is valid especially in a time division duplex (TDD) system in which the downlink and the uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs in each radio frame. These configurations may provide flexibility with which SRS overhead can be adjusted according to network deployment scenarios. The other one configuration (a $16^{th}$ configuration) represented by the parameter is perfect switch-off of SRS transmission in a cell, suitable for a cell serving high-speed UEs, for example.

Figure 7:
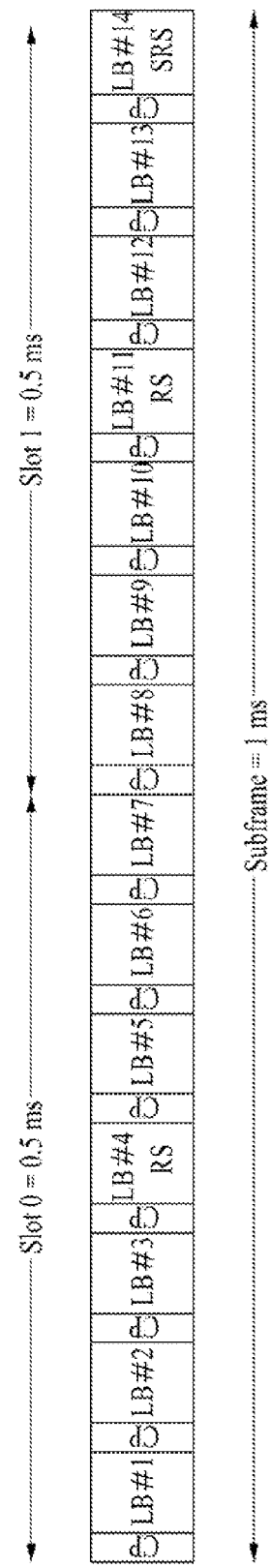
FIG. 7 illustrates a sounding reference signal.

As shown in FIG. 7, an SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Relay

A relay is considered in order to improve the coverage of high data rates, group mobility, temporary network deployment, cell edge throughput and/or to provide coverage in new areas.

The relay forwards transmission and reception between an eNB and a UE, and two links (backhaul link and access link) having different attributes are applied to each carrier frequency band. The eNB may include a donor cell. The relay wirelessly accesses a wireless access network through the donor cell.

A backhaul link between the eNB and the relay may be represented as a backhaul downlink when the backhaul link uses a downlink frequency band or a downlink subframe resource and represented as a backhaul uplink when the backhaul link uses an uplink frequency band or an uplink subframe resource. Here, a frequency band is a resource allocated in frequency division duplex (FDD) mode and a subframe is a resource allocated in time division duplex (TDD) mode. Similarly, an access link between the eNB and the relay may be represented as an access downlink when the access link uses a downlink frequency band or a downlink subframe resource and represented as access uplink when the access link uses an uplink frequency band or an uplink subframe resource.

The eNB needs to have uplink reception and downlink transmission functions and the UE needs to have uplink transmission and downlink reception functions. The relay needs to have functions of backhaul uplink transmission to the eNB, access uplink reception from the UE, backhaul downlink reception from the eNB and access downlink transmission to the UE.

In relation to the use of a bandwidth (or spectrum) of a relay, the case where a backhaul link operates in the same frequency band as an access link is referred to as in-band, and the case where the backhaul link operates in different frequency bands from the access link is referred to as out-band. In both the in-band and the out-band, UEs operating according to LTE (e.g., Release-8) should be able to access a donor cell.

The relay may be classified into a transparent relay and a non-transparent relay depending on whether or not the UE recognizes the relay. In the transparent relay, the UE is not aware that it is communicating with a network via the relay, and in the non-transparent relay, the UE is aware that it is communicating with the network via the relay.

In relation to control of the relay, the relay may be divided into a relay as part of a donor cell and a relay for controlling a cell of its own.

The relay as part of the donor cell may have a relay ID but does not have a cell ID of its own. If at least part of Radio Resource Management (RRM) is controlled by an eNB to which the donor cell belongs (while parts of the RRM may be located in the relay), this may be called a relay as part of the donor cell. Desirably, such a relay may support legacy UEs. Smart repeaters, decode-and-forward relays, different types of L2 (second layer) relays, and type-2 relays are examples of this type of relay.

In the case where a relay is in control of its own cells, the relay controls one or several cells and a unique physical-layer cell ID is provided to each of the cells controlled by the relay. The same RRM mechanism is available and in terms of the UE there is no difference in accessing cells controlled by a relay and cells controlled by a normal eNB. The cells controlled by the relay may support the legacy UEs. Self-backhauling relays, L3 (third layer) relays, type-1 relays, and type-1a relays are examples of this type of relay.

A type-1 relay is an in-band relay and controls a plurality of cells, each of which appears as a separate cell, distinct from the donor cell, to UEs. The plurality of cells has its own physical cell ID (defined in LTE Release-8) and the relay may transmit its own synchronization channels, reference signals, etc. In the context of single-cell operation, the UE may receive scheduling information and HARQ feedback directly from the relay and may transmit its own control channels (SR, CQI, ACK/NACK, etc.) to the relay. The type-1 relay appears as a legacy eNB (an eNB operating according to LTE Release-8) to legacy UEs (UEs operating according to LTE Release-8). Namely, the type-1 relay has backward compatibility. Meanwhile, to UEs operating according to an LTE-A system, the type-1 relay appears as an eNB different from the legacy eNB to allow for performance enhancement.

A type-1a relay has the same characteristics as the above-mentioned type-1 relay except that it operates in out-band. The operation of the type-1a relay may be configured to minimize an influence on the operation of an L1 (first layer) or to eliminate such influence.

A type-2 relay, which is an in-band relay, does not have a separate physical cell ID and thus does not create any new cells. The type-2 relay is transparent to the legacy UEs, and the legacy UEs are not aware of the presence of the type-2 relay. The type-2 relay may transmit a PDSCH but does not transmit a Common Reference Signal (CRS) and a PDCCH.

Meanwhile, in order to allow in-band operation of the relay, some resources in the time-frequency space should be reserved for the backhaul link and may be set not to be used for the access link. This is called resource partitioning.

A general principle for resource partitioning in the relay is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay and uplink subframes of the eNB and relay, respectively.

In the case of an in-band relay, for example, if reception of the backhaul downlink from the eNB and transmission of the access downlink to the UE are simultaneously performed in a predetermined frequency band, a signal transmitted from a transmitting end of the relay may be received in a receiving end of the relay and thus signal interference or Radio Frequency (RF) jamming may occur at an RF front end of the relay. Similarly, if reception of the access uplink from the UE and transmission of the backhaul uplink to the eNB are simultaneously performed in a predetermined frequency band, signal interference may occur at the RF front end of the relay. Accordingly, in the relay, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installing them above/below ground)).

Figure 8:
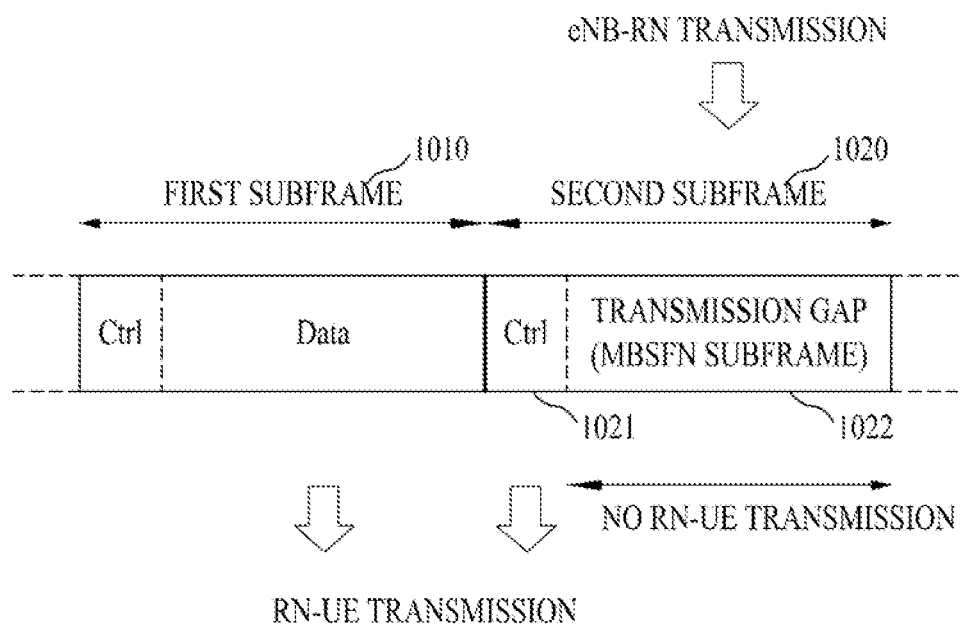
FIG. 8 illustrates resource partitioning for a relay.

One method for solving the problem of signal interference is to allow the relay not to transmit a signal to UEs while receiving a signal from the donor cell. That is, a gap may be generated in transmission to the UEs from the relay and the UEs (including the legacy UEs) may be set not to expect any transmission from the relay during the gap. In FIG. 8, a first subframe 1010 is a normal subframe in which a downlink (i.e. access downlink) control signal and data are transmitted from the relay to the UE and a second subframe 1020 is a multicast broadcast single frequency network (MBSFN) subframe. A control signal is transmitted from the relay to the UE in a control region 1021 of the downlink subframe, whereas no signal is transmitted from the relay to the UE in the remaining region 1022 of the downlink subframe. Here, in the case of a legacy UE, since transmission of a physical downlink control channel (PDCCH) is expected in all downlink frames (in other words, the relay needs to support legacy UEs belonging to the coverage thereof such that the legacy UEs receive and measure PDCCHs in every subframe), it is necessary to transmit a PDCCH in all downlink subframes for correct operation of legacy UEs. Accordingly, even in a subframe (second subframe 1020) configured for downlink (i.e. backhaul downlink) transmission from the eNB to the relay, the relay needs to perform access downlink transmission instead of backhaul downlink reception in a period corresponding to first N (N=1, 2 or 3) OFDM symbols of the subframe. For this, since a PDCCH is transmitted from the relay to the UE in the control region 1021 of the second subframe, backward compatibility for legacy UEs served by the relay can be provided. The relay can receive a signal transmitted from the eNB in the remaining region 1022 of the second subframe since no signal is transmitted from the relay to the UE in the region 1022. Accordingly, through such a resource partitioning scheme, access downlink transmission and backhaul downlink reception can be prevented from being simultaneously performed in an in-band relay.

The second subframe 1022 using an MBSFN subframe will be described in detail hereinafter. The MBSFN subframe is a subframe for multimedia broadcast and multicast service (MBMS) for simultaneously transmitting the same signal in multiple cells. The control region 1021 of the second subframe may be regarded as a relay non-hearing period. The relay non-hearing period refers to a period in which a relay transmits an access downlink signal instead of receiving a backhaul downlink signal. The relay non-hearing period can be set to a length of 1, 2 or 3 OFDM symbols, as described above. The relay can perform access downlink transmission to the UE in the relay non-hearing period 1021 and receive a backhaul downlink signal from the eNB in the remaining region 1022. Here, since the relay cannot simultaneously perform transmission and reception in the same frequency band, time is taken for the relay to switch from transmission mode to reception mode. Accordingly, a guard time GT needs to be set to the first part of the backhaul downlink reception region 1022 such that the relay can perform transmission/ reception mode switching in the region 1022. Similarly, even when the relay receives a backhaul downlink signal from the eNB and transmits an access downlink signal to the UE, a guard time (GT) for reception/transmission mode switching of the relay can be set. The duration of the GT may be set to a value in the time domain. For example, the duration of the GT can be set to k (k=1) time sample (Ts) or one or more OFDM symbols. A GT of the last part of the subframe may not be defined or set when relay backhaul downlink subframes are continuously configured or according to a predetermined subframe timing alignment relationship. This GT may be defined only in a frequency region set for backhaul downlink subframe transmission in order to maintain backward compatibility (legacy UEs cannot be supported when a GT is set in an access downlink period). The relay can receive a PDCCH and a PDSCH from the eNB in the backhaul downlink reception period 1022 other than the GT. Particularly, a PDCCH for the relay can be represented as a relay-PDCCH (R-PDCCH) in the sense of a relay dedicated physical channel.

Physical Uplink Control Channel (PUCCH)

Uplink control information (UCI) transmitted on a PUCCH may include a scheduling request (SR), HARQ ACK/NACK information, and downlink channel measurement information.

The HARQ ACK/NACK information may be generated according to whether a downlink data packet on a PDSCH is successfully decoded. In conventional wireless communication systems, 1 bit is transmitted as ACK/NACK information for downlink single codeword transmission and 2 bits are transmitted as the ACK/NACK information for downlink 2-codeword transmission.

The channel measurement information represents feedback information about a multiple input multiple output (MIMO) scheme and may include a channel quality indicator (CQI), a precoding matrix index (PMI), and a rank indicator (RI) which may be collectively referred to as a CQI. 20 bits per subframe may be used to transmit the CQI.

A PUCCH can be modulated using binary phase shift keying (BPSK) and quadrature phase shift keying (QPSK). Control information of a plurality of UEs can be transmitted through a PUCCH. When code division multiplexing (CDM) is performed in order to distinguish signals of the UEs from one another, a length-12 constant amplitude zero autocorrelation (CAZAC) sequence is used. The CAZAC sequence is suitable to increase coverage by reducing a peak-to-average power ratio (PAPR) of a UE or cubic metric (CM) because it maintain a specific amplitude in the time domain and the frequency domain. ACK/NACK information with respect to downlink data transmitted through a PUCCH is covered using an orthogonal sequence or an orthogonal cover (OC).

Control information signals transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may vary according to channel delay spread. Various types of sequences may be used as the base sequence and the aforementioned CAZAC sequence is an example of the various sequences.

The amount of control information that can be transmitted by a UE through a subframe can be determined according to the number of SC-FDMA symbols (i.e. SC-FDMA symbols other than SC-FDMA symbols used for reference signal (RS) transmission for detection of coherent of a PUCCH) which can be used for control information transmission.

In 3GPP LTE, a PUCCH is defined in seven different formats according to transmitted control information, modulation scheme and the quantity of control information and attributes of transmitted uplink control information (UCI) according to each PUCCH format can be summarized as shown in Table 1.

TABLE 1

| PUCCH format | Modulation scheme | Number of bits per subframe | Usage | etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is solely transmitted, an unmodulated waveform is applied, which will be described in detail below.

PUCCH format 1a or 1b is used for HARQ ACK/NACK transmission. When HARQ ACK/NACK is solely transmitted in a subframe, PUCCH format 1a or 1b may be used. Furthermore, HARQ ACK/NACK and SR may be transmitted in the same subframe using PUCCH format 1a or 1b.

PUCCH format 2 is used for CQI transmission whereas PUCCH format 2a or 2b is used for transmission of CQI and HARQ ACK/NACK. In the extended CP case, PUCCH format 2 may be used for transmission of CQI and HARQ ACK/NACK.

Figure 9:
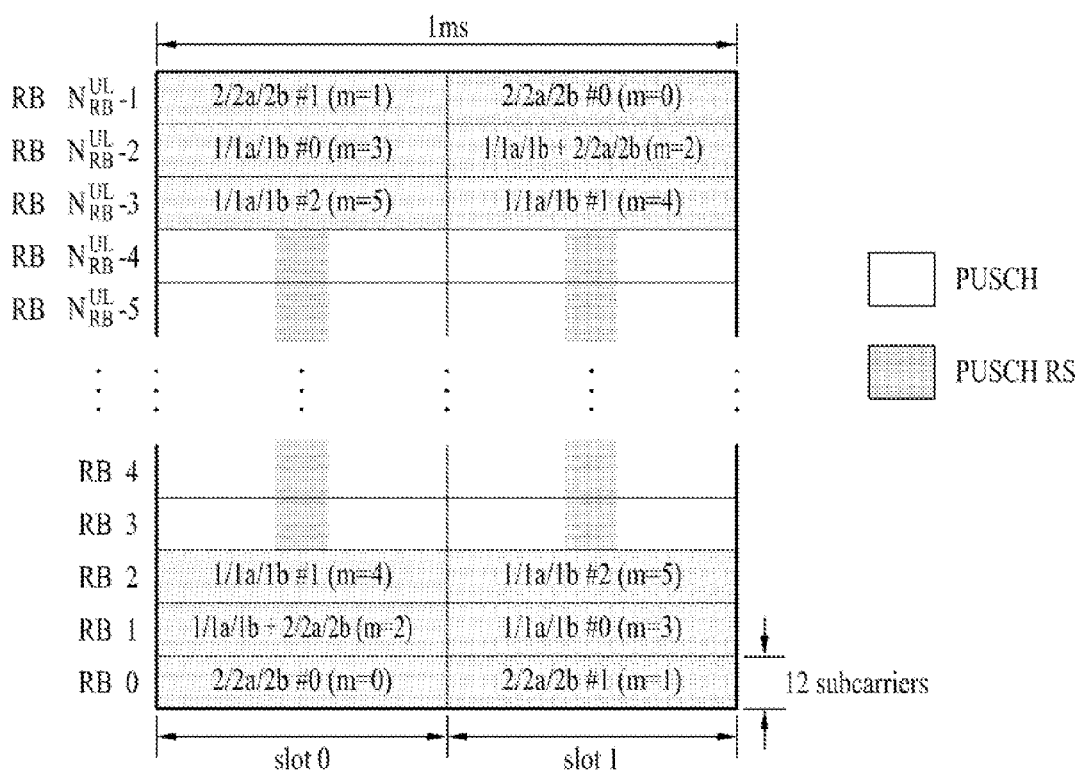
FIG. 9 illustrates mapping of PUCCH formats in uplink physical resource blocks.

FIG. 9 illustrates mapping of PUCCH formats to PUCCH regions in uplink physical resource blocks. In FIG. 9, $N_{RB}^{UL}$ denotes the number of resource blocks on uplink and 0, 1, ..., $N_{RB}^{UL}-1$ denote physical resource block numbers. PUCCHs are mapped to both edges of uplink frequency blocks basically. As shown in FIG. 6, PUCCH formats 2/2a/2b are mapped to PUCCH regions indicated by m=0,1, which represents that PUCCH formats 2/2a/2b are mapped to resource blocks located at band-edges. PUCCH formats 2/2a/2b and PUCCH formats 1/1a/1b may be mixed and mapped to PUCCH regions indicated by m=2. PUCCH formats 1/1a/1b may be mapped to PUCCH regions indicated by m=3,4,5. The number $N_{RB}^{(2)}$ of PUCCH RBs can be used by PUCCH formats 2/2a/2b may be signaled to UEs in a cell through broadcasting signaling.

PUCCH Resource

A BS allocates a PUCCH resource for UCI transmission to a UE using an explicit or implicit method through higher layer signaling.

In the case of ACK/NACK, a plurality of PUCCH resource candidates may be set for a UE by a higher layer and a PUCCH resource to be used by the UE from among the PUCCH resource candidates may be implicitly determined. For example, the UE can receive a PDSCH from the BS and transmit ACK/NACK for a corresponding to data unit through a PUCCH resource implicitly indicated by a PDCCH resource carrying scheduling information on the PDSCH.

Figure 10:
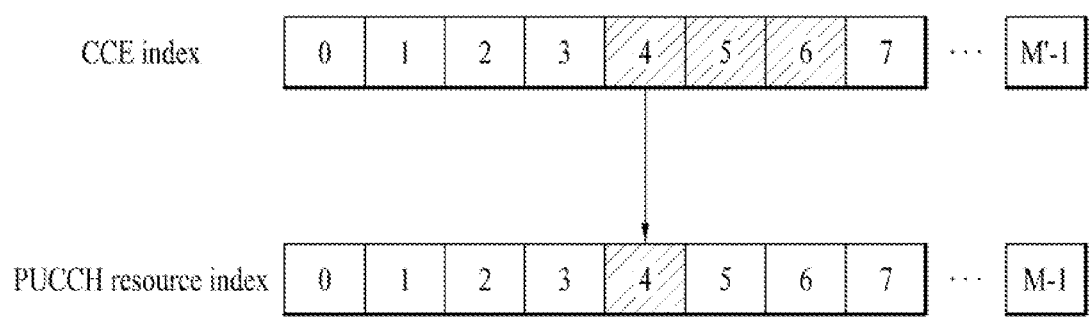
FIG. 10 illustrates an example of determining a PUCCH resource for ACK/NACK.

FIG. 10 illustrates an example of determining a PUCCH resource for ACK/NACK.

In LTE, a PUCCH resource that will carry ACK/NACK information is not previously allocated to a UE. Rather, plural PUCCH resources are used separately at each time instant plural UEs within a cell. Specifically, a PUCCH resource that a UE will use to transmit ACK/NACK information is implicitly indicated by a PDCCH carrying scheduling information for a PDSCH that delivers downlink data. An entire area carrying PDCCHs in a DL subframe include a plurality of Control Channel Elements (CCEs) and a PDCCH transmitted to a UE includes one or more CCEs. A CCE includes a plurality of (e.g. 9) Resource Element Groups (REGs). One REG includes four contiguous REs except for an RS. The UE transmits ACK/NACK information on an implicit PUCCH that is derived or calculated by a function of a specific CCE index (e.g. the first or lowest CCE index) from among the indexes of CCEs included in a received PDCCH.

Referring to FIG. 10, each PUCCH resource index can correspond to a PUCCH resource for ACK/NACK. As shown in FIG. 10, if a PDCCH including CCEs #4, #5 and #6 delivers scheduling information on a PDSCH to a UE, the UE transmits ACK/NACK information to a BS on a PUCCH, for example, PUCCH #4 derived or calculated using the lowest CCE index of the PDCCH, CCE index 4. FIG. 10 illustrates a case in which up to M' CCEs are present in a downlink subframe and up to M PUCCHs are present in an uplink subframe. Although M may be equal to M', M may be different from M' and CCEs may be mapped to PUCCHs in an overlapping manner.

For instance, a PUCCH resource index may be calculated by the following equation.

$$n^{(1)}_{PUCCH} = n_{CCE} + N^{(1)}_{PUCCH}$$ [Equation 15]

Here, $n^{(1)}_{PUCCH}$ denotes the index of a PUCCH resource for transmitting ACK/NACK information, $N^{(1)}_{PUCCH}$ denotes a signaling value received from a higher layer, and $n_{CCE}$ denotes the lowest of CCE indexes used for transmission of a PDCCH.

PUCCH Channel Structure

PUCCH formats 1a and 1b are described.

In the PUCCH format 1a/1b, a symbol modulated using BPSK or QPSK is multiplied by a CAZAC sequence of length 12. For example, when a modulated symbol d(0) is multiplied by a length-N CAZAC sequence r(n) (n=0, 1, 2, ..., N-1), y(0), y(1), y(2), ..., y(N-1) are obtained. Symbols y(0), y(1), y(2), ..., y(N-1) may be called a block of symbols. Upon completion of the CAZAC sequence multiplication, the resultant symbol is blockwise-spread using an orthogonal sequence.

A Hadamard sequence of length 4 is applied to general ACK/NACK information, and a DFT (Discrete Fourier Transform) sequence of length 3 is applied to shortened ACK/NACK information and a reference signal. A Hadamard sequence of length 2 may be applied to the reference signal in the case of the extended CP.

Figure 11:
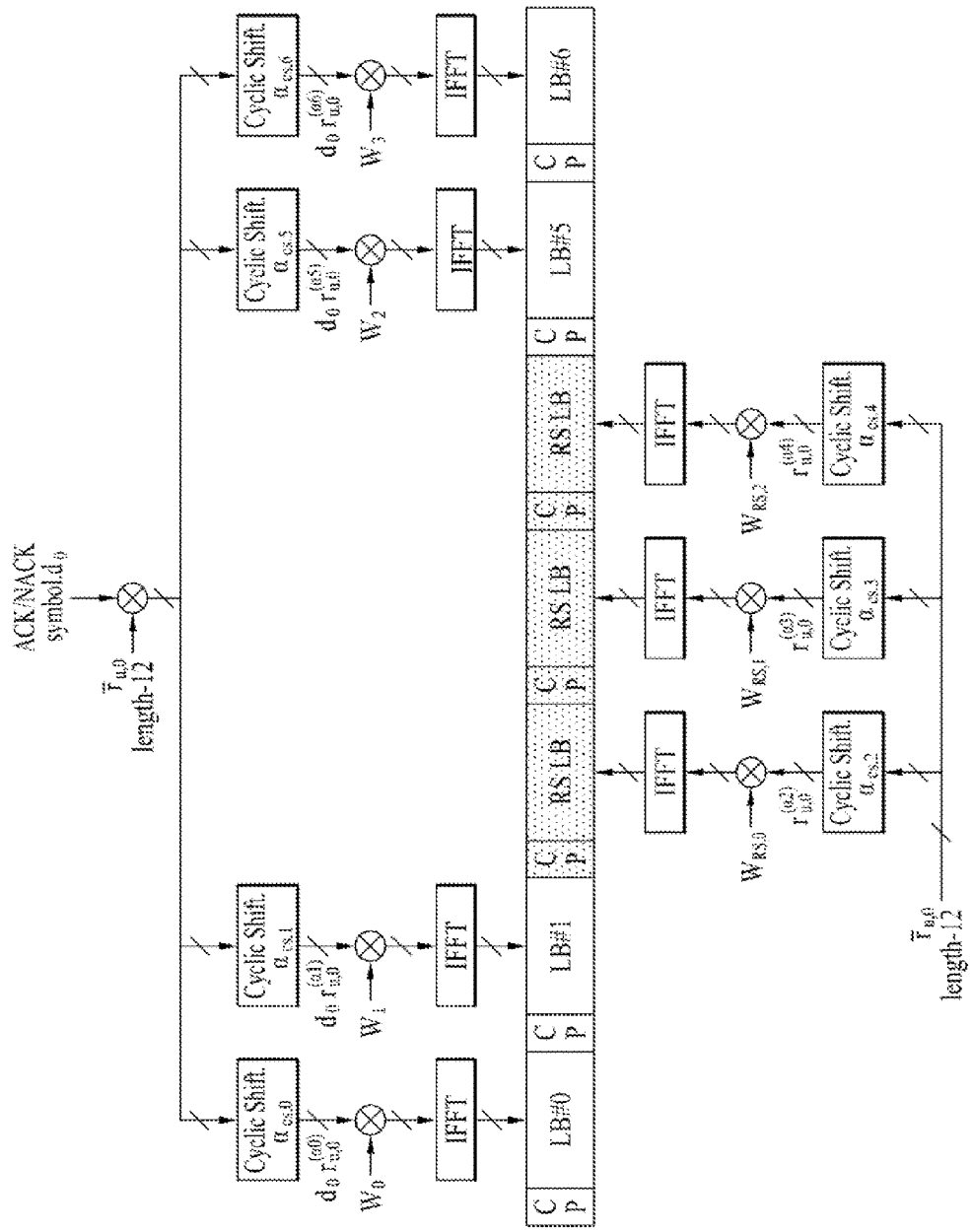
FIG. 11 illustrates an ACK/NACK channel structure in a normal CP case.

FIG. 11 illustrates an ACK/NACK channel structure in normal CP case. FIG. 11 shows an exemplary PUCCH channel structure for HARQ ACK/NACK transmission without CQI. Three contiguous SC-FDMA symbols in the middle of seven SC-FDMA symbols carry an RS and the remaining four SC-FDMA symbols carry an ACK/NACK signal. In the case of the extended CP, two contiguous symbols in the middle of SC-FDMA symbols may carry an RS. The number and positions of symbols used for the RS may depend on a control channel and the number and positions of symbols used for the ACK/NACK signal may be changed according to the number and positions of symbols used for the RS.

1-bit ACK/NACK information and 2-bit ACK/NACK information (unscrambled) may be represented a HARQ ACK/NACK modulation symbol using BPSK and QPSK, respectively. ACK information may be encoded as '1' and NACK information may be encoded as '0'.

When a control signal is transmitted in an allocated band, 2-dimensional spreading is applied to improve multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one type of CAZAC sequence, can be used as the frequency domain sequence. For example, different cyclic shifts (CSs) can be applied to a ZC sequence as a basic sequence to multiple different UEs or different control channels. The number of CS resources supported by SC-FDMA symbols for PUCCH RBs for HARQ ACK/NACK transmission is set by a cell-specific higher-layer signaling parameter $\Delta_{shift}^{PUCCH}$ and $\Delta_{shift}^{PUCCH} \in \{1, 2, 3\}$ represents 12, 6 or 4 shifts.

The frequency-domain-spread ACK/NACK signal is spread in the time domain using an orthogonal spreading code. A Walsh-Hadamard sequence or a DFT sequence can be used as the orthogonal spreading code. For example, an ACK/NACK signal can be spread using a length-4 orthogonal sequence w0, w1, w2, w3. An RS is spread using a length-2 or length-2 orthogonal sequence. This is called orthogonal covering (OC).

A plurality of UEs can be multiplexed through code division multiplexing (CDM) using CS resources in the frequency domain and OC resources in the time domain as described above. That is, ACK/NACK information and RSs of a large number of UEs can be multiplexed on the same PUCCH RB.

For time domain spreading CDM, the number of spreading codes supported for ACK/NACK information is limited by the number of RS symbols. That is, since the number of SC-FDMA symbols for RS transmission is smaller than the number of SC-FDMA symbols for ACK/NACK transmission, multiplexing capacity of an RS is less than multiplexing capacity of ACK/NACK information. For example, while ACK/NACK information can be transmitted through four symbols in the normal CP case, three orthogonal spreading codes are used for ACK/NACK information because the number of RS transmission symbols is limited to three and thus only three orthogonal spreading codes can be used for the RS.

Examples of an orthogonal sequence used to spread ACK/NACK information are shown in Tables 2 and 3. Table 2 shows a sequence for a length-4 symbol and Table 3 shows a sequence for a length-3 symbol. The sequence for the length-4 symbol is used in PUCCH format 1/1a/1b of a normal subframe configuration. Considering a case in which an SRS is transmitted on the last symbol of the second slot in a subframe configuration, the sequence for the length-4 symbol can be applied to the first slot and shortened PUCCH format 1/1a/1b of the sequence for the length-3 symbol can be applied to the second slot.

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 3

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

An exemplary orthogonal sequence used for RS spreading of an ACK/NACK channel is as shown in Table 4.

TABLE 4

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

When three symbols are used for RS transmission and four symbols are used for ACK/NACK information transmission in a slot of a normal CP subframe, if six CSs in the frequency domain and three OC resources in the time domain can be used, for example, HARQ ACK/NACK signals from a total of 18 different UEs can be multiplexed in a PUCCH RB. When two symbols are used for RS transmission and four symbols are used for ACK/NACK information transmission in a slot of an extended CP subframe, if six CSs in the frequency domain and two OC resources in the time domain can be used, for example, HARQ ACK/NACK signals from a total of 12 different UEs can be multiplexed in a PUCCH RB.

PUCCH format 1 is described. A UE requests scheduling through a scheduling request (SR). An SR channel reuses an ACK/NACK channel structure in the PUCCH format 1a/1b and is configured in an on-off keying manner on the basis of ACK/NACK channel design. A reference signal is not transmitted on the SR channel. Accordingly, a length-7 sequence is used in the normal CP case and a length-6 sequence is used in the extended CP case. Different CSs or orthogonal covers may be allocated to an SR and ACK/NACK. That is, for positive SR transmission, a UE transmits HARQ ACK/NACK through a resource allocated for the SR. For negative SR transmission, the UE transmits HARQ ACK/NACK through a resource allocated for ACK/NACK.

The PUCCH format 2/2a/2b is will now be described. The PUCCH format 2/2a/2b is used to transmit channel measurement feedback (CQI, PMI and RI).

A channel feedback (referred to as CQI hereinafter) reporting period and a frequency unit (or frequency resolution) corresponding to a measurement target can be controlled by an eNB. Periodic and aperiodic CQI reports can be supported in the time domain. PUCCH format 2 can be used for the periodic report only and a PUSCH can be used for the aperiodic report. In the case of aperiodic report, the eNB can instruct a UE to transmit an individual CQI report on a resource scheduled to transmit uplink data.

Figure 12:
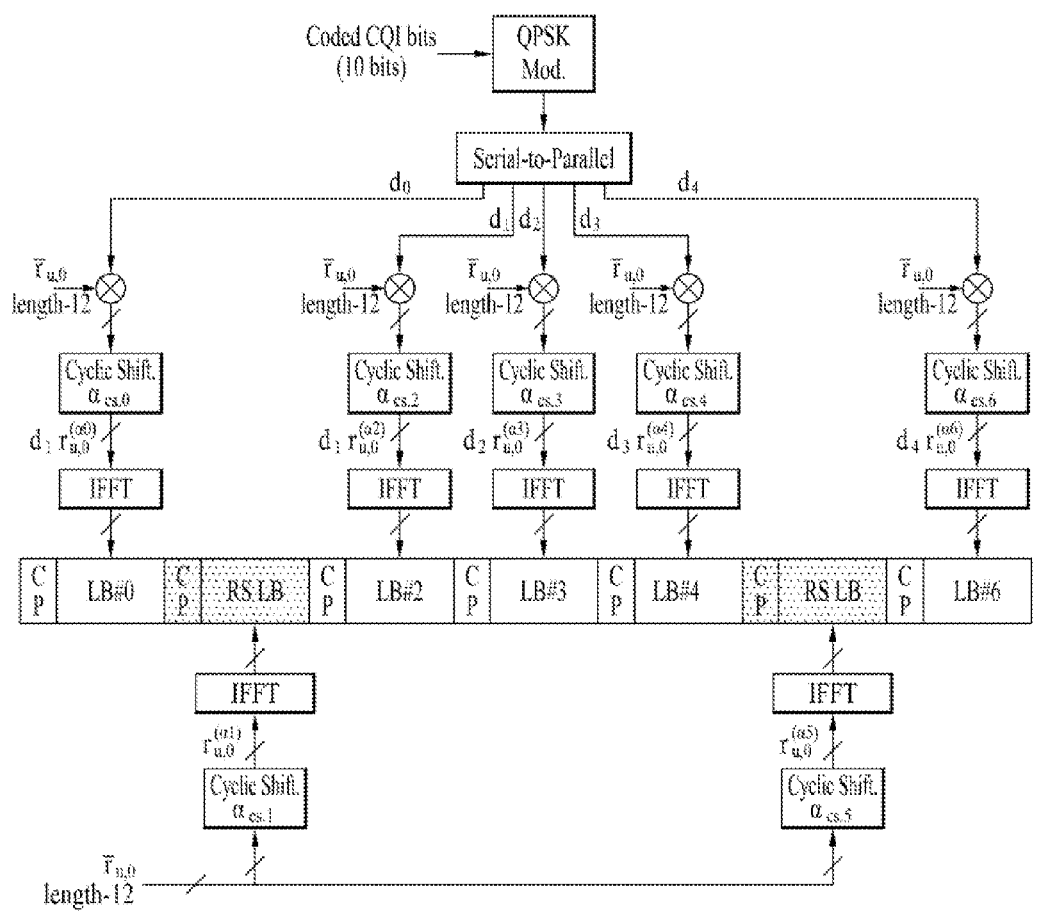
FIG. 12 illustrates a CQI channel structure in the normal CP case.

FIG. 12 illustrates a CQI channel structure in the case of normal CP. SC-FDMA symbols #1 to #5 (second and sixth symbols) from among SC-FDMA symbols #0 to #6 of a slot can be used for DMRS transmission and the remaining SC-FDMA symbols can be used for CQI transmission. In the case of extended CP, an SC-FDMA symbol (SC-FDMA symbol #3) is used for DMRS transmission.

The PUCCH format 2/2a/2b supports modulation by a CAZAC sequence and a symbol modulated according to QPSK is multiplied by a CAZAC sequence of length 12. A CS of the sequence is changed between symbols and between slots. Orthogonal covering is used for the DMRS.

Two SC-FDMA symbols having a distance therebetween, which corresponds to the interval of three SC-FDMA symbols, from among seven SC-FDMA symbols included in a slot carry a DMRS and the remaining five SC-FDMA symbols carry CQI. Two RSs are used in a slot in order to support a fast UE. Each UE is identified using a CS sequence. CQI symbols are modulated into SC-FDMA symbols and transmitted. The SC-FDMA symbols are composed of a sequence. That is, a UE modulates CQI into each sequence and transmits the sequence.

The number of symbols that can be transmitted in a TTI is 10 and modulation of CQI is performed using QPSK. When QPSK mapping is used for SC-FDMA symbols, an SC-FDMA symbol can carry 2-bit CQI and thus a slot can carry 10-bit CQI. Accordingly, a maximum of 20-bit CQI can be transmitted in a subframe. To spread CQI in the frequency domain, a frequency domain spreading code is used.

A length-12 CAZAC sequence (e.g. ZC sequence) can be used as the frequency domain spreading code. Control channels can be discriminated from each other using CAZAC sequences having different CS values. The frequency-domain-spread CQI is subjected to IFFT.

12 different UEs can be orthogonally multiplexed in the same PUCCH RB using 12 CSs at an equal interval. In the case of normal CP, while a DMRS sequence on SC-FDMA symbols #1 and #5 (SC-FDMA symbols #3 in the case of extended CP) is similar to a CQI signal sequence in the frequency domain, the DMRS sequence is not modulated. A UE can be semi-statically configured by higher layer signaling to periodically report different CQI, PMI and RI types on a PUCCH resource indicated by a PUCCH resource index $n_{PUCCH}^{(2)}$. Here, the PUCCH resource index $n_{PUCCH}^{(2)}$ is information indicating a PUCCH region and a CS value used for PUCCH format 2/2a/2b transmission.

An enhanced PUCCH (e-PUCCH) format will now be described. The e-PUCCH format may correspond to the PUCCH format 3 of LTE-A. Block spreading can be applied to ACK/NACK transmission using PUCCH format 3.

Block spreading is a method of modulating a control signal using SC-FDMA, distinguished from the PUCCH format 1 series or 2 series. As shown in FIG. 13, a symbol sequence can be spread in the time domain using an orthogonal cover code (OCC) and transmitted. Control signals of plural UEs can be multiplexed in the same RB using the OCC. A symbol sequence is transmitted in the time domain and control signals of multiple UEs are multiplexed using CSs of a CAZAC sequence in the above-described PUCCH format 2, whereas a symbol sequence is transmitted in the frequency domain and control signals of multiple UEs are multiplexed through time domain spreading using an OCC in the block spreading based PUCCH format (e.g. PUCCH format 3).

FIG. 13(a) illustrates an example of generating and transmitting four SC-FDMA symbols (i.e. data part) using a length-4 (or spreading factor (SF)=4) OCC in a symbol sequence during one slot. In this case, three RS symbols (i.e. RS part) can be used in one slot.

FIG. 13(b) illustrates an example of generating and transmitting five SC-FDMA symbols (i.e. data part) using a length-5 (or SF=5) OCC in a symbol sequence during one slot. In this case, two RS symbols can be used per slot.

In the examples of FIG. 13, the RS symbols can be generated from a CAZAC sequence to which a specific CS value is applied, and a predetermined OCC can be applied to (or multiplied by) a plurality of RS symbols and transmitted. If 12 modulated symbols are used per OFDM symbol (or SC-FDMA symbol) and each modulated symbol is generated according to QPSK in the example of FIG. 13, a maximum of 12×2=24 bits can be transmitted in a slot. Accordingly, a total of 48 bits can be transmitted in two slots. When a block spreading based PUCCH channel structure is used as described above, it is possible to transmit an increased quantity of control information compared to the PUCCH format 1 series and 2 series.

Carrier Aggregation

Figure 14:
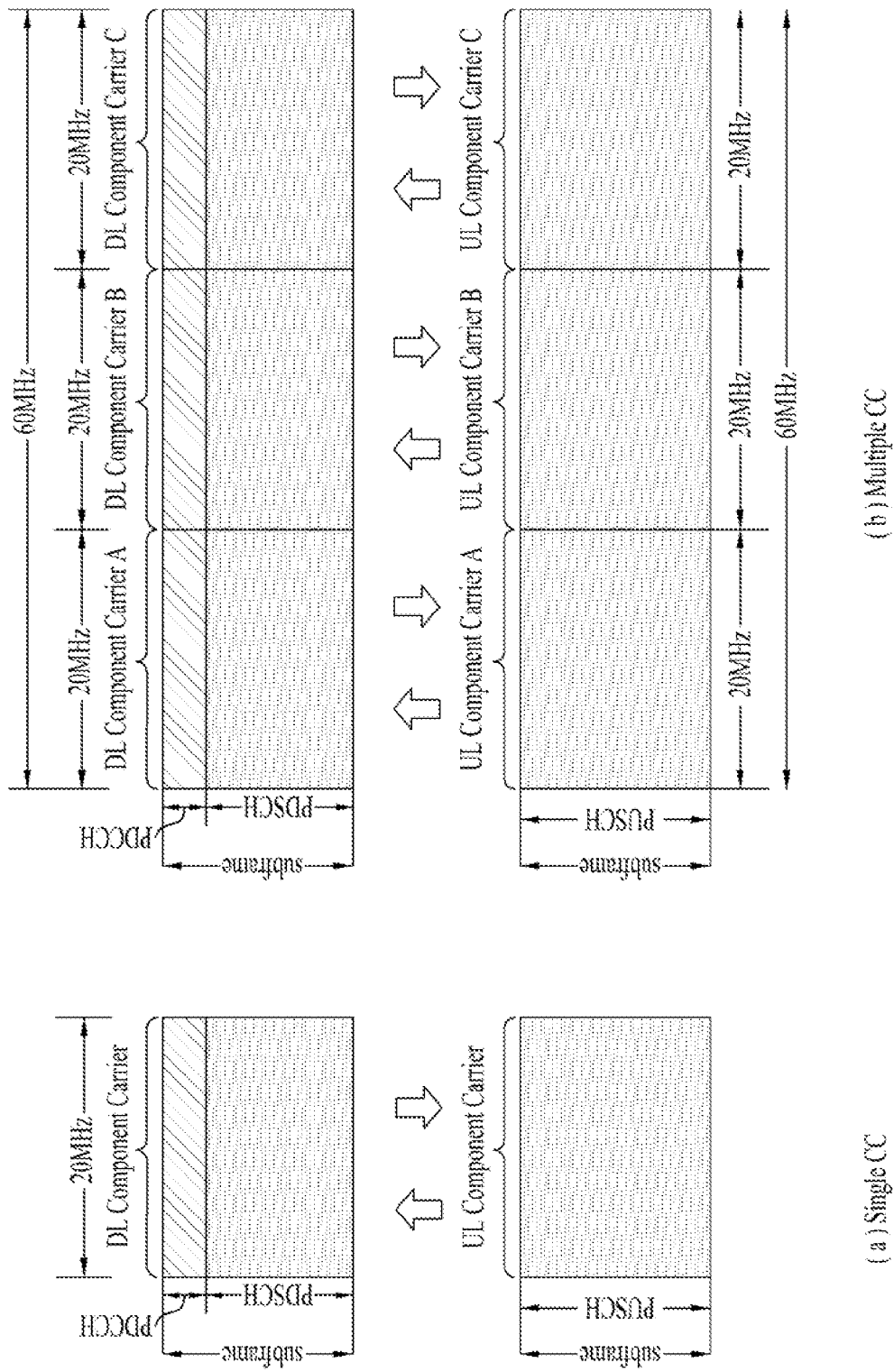
FIG. 14 illustrates carrier aggregation.

FIG. 14 illustrates carrier aggregation. The concept of a cell, which is introduced to manage radio resources in LTE-A is described prior to carrier aggregation (CA). A cell may be regarded as a combination of downlink resources and uplink resources. The uplink resources are not essential elements, and thus the cell may be composed of the downlink resources only or both the downlink resources and uplink resources. This is definition in LTE-A release 10, and the cell may be composed of the uplink resources only. The downlink resources may be referred to as downlink component carriers and the uplink resources may be referred to as uplink component carriers. A DL CC and a UL CC may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCell. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCell in addition to a PCell initially configured during connection establishment after initial security activation is initiated.

CA is described with reference to FIG. 14. CA is a technology introduced to use a wider band to meet demands for a high transmission rate. CA can be defined as aggregation of two or more component carriers (CCs) having different carrier frequencies. FIG. 14(a) shows a subframe when a conventional LTE system uses a single CC and FIG. 14(b) shows a subframe when CA is used. In FIG. 14(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 15:
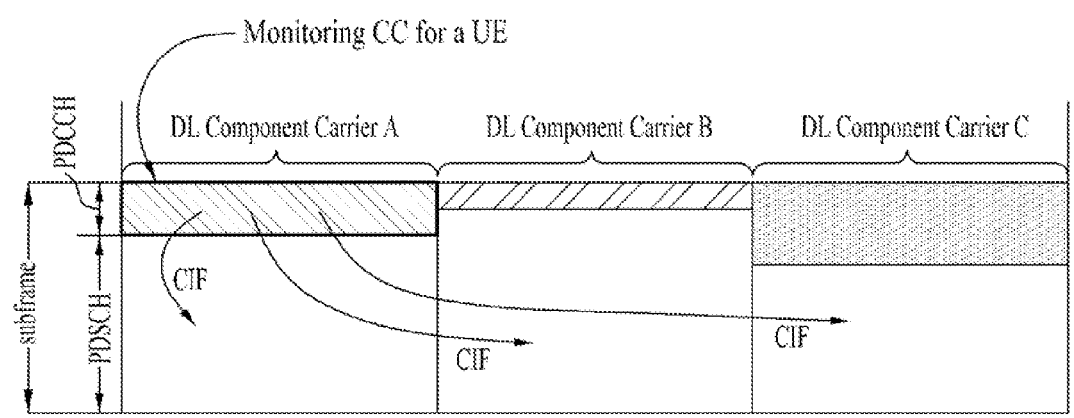
FIG. 15 illustrates cross-carrier scheduling.

FIG. 15 is a diagram illustrating cross-carrier scheduling. Cross carrier scheduling is scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 15, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling.

When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed 3-bit length, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 15, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above-mentioned ACK/NACK bundling or multiplexing when the number of ACK/NACK bits to be transmitted is greater than the number of ACK/NACK bits that can be supported by ACK/NACK bundling or multiplexing.

ACK/NACK Multiplexing Scheme

In case of ACK/NACK multiplexing, the contents of an ACK/NACK response to a plurality of data units can be identified by a combination of an ACK/NACK unit actually used for ACK/NACK transmission and symbols modulated according to QPSK. For example, if an ACK/NACK unit carries 2-bit information and receives a maximum of two data units and a HARQ ACK/NACK response to each of the received data units is represented by an ACK/NACK bit, a transmitter that has transmitted data can identify ACK/NACK results as shown in Table 5.

TABLE 5

| HARQ-ACK(0), HARQ-ACK(1) | $n_{PUCCH}^{(1)}$ | b(0), b(1) |
| --- | --- | --- |
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 5, HARQ-ACK(i) (i=0, 1) represents an ACK/NACK result with respect to data unit i. Since a maximum of two data units (data unit 0 and data unit 1) are received as described above, an ACK/NACK result with respect to data unit 0 is represented as HARQ-ACK(0) and an ACK/NACK result with respect to data unit 1 is represented as HARQ-ACK(1) in Table 6. DTX (Discontinuous Transmission) indicates that the data unit corresponding to HARQ-ACK(i) is not transmitted or a receiver cannot detect the data unit corresponding to HARQ-ACK(i). In Table 6, $n_{PUCCH,X}^{(1)}$ denotes an ACK/NACK unit used for actual ACK/NACK transmission. When a maximum of two ACK/NACK units are present, the ACK/NACK units can be represented as $n_{PUCCH,0}^{(1)}$ and $n_{PUCCH,1}^{(1)}$. In addition, b(0) and b(1) denote two bits transmitted by selected ACK/NACK units. Modulated symbols transmitted through ACK/NACK units are determined based on b(0) and b(1).

For example, when the receiver successfully receives and decodes two data units (in the case of ACK and ACK of Table 5), the receiver transmits two bits (1, 1) using the ACK/NACK unit $n_{PUCCH,1}^{(1)}$. If the receiver receives two data units, fails to decode (or detect) the first data unit (i.e. data unit 0 corresponding to HARQ-ACK(0)) and successfully decodes the second data unit (i.e. data unit 1 corresponding to HARQ-ACK(1)) (in the case of NACK/DTX and ACK of Table 5), the receiver transmits two bits (0, 0) using the ACK/NACK unit $n_{PUCCH,1}^{(1)}$.

As described above, it is possible to transmit ACK/NACK information about a plurality of data units using a single ACK/NACK unit by linking or mapping a combination of a selected ACK/NACK unit and bits of the selected ACK/NACK unit (i.e. a combination of $n_{PUCCH,0}^{(1)}$ or $n_{PUCCH,1}^{(1)}$ and b(0) and b(1) in FIG. 5) to the contents of ACK/NACK. ACK/NACK multiplexing for two or more data units can be easily implemented by extending the principle of the above-described ACK/NACK multiplexing.

In the above-described ACK/NACK multiplexing scheme, NACK and DTX may not be discriminated from each other when one or more ACKs are present for each data unit (that is, NACK and DTX can be coupled as NACK/DTX as shown in Table 5). This is because all ACK/NACK states (i.e. ACK/NACK hypotheses) that may be generated when NACK and DTX are discriminated from each other cannot be represented by only combinations of ACK/NACK units and symbols modulated by BPSK. When ACK is not present for any data unit (that is, only NACK or DTX is present for all data units), a single definite NACK case that represents a definite NACK (NACK discriminated from DTX) from among HARQ-ACK (i) can be defined. In this case, a PUCCH resource corresponding to a data unit with respect to a definite NACK may be reserved to transmit a plurality of ACK/NACK signals.

Semi-Persistent Scheduling

DL/UL SPS signals which subframe (subframe period and offset) is used for a UE to perform SPS transmission/reception to the UE through radio resource control (RRC) signaling, and then performs actual SPS activation and release through a PDCCH. That is, the UE performs SPS upon receiving the PDCCH that signals activation (or reactivation) (i.e. upon receiving a PDCCH from which SPS C-RNTI is detected) rather than performing SPS TX/RX right after being allocated SPS through RRC signaling. Specifically, upon reception of an SPS activation PDCCH, the UE may assign a frequency resource according to RB allocation designated by the PDCCH and start to perform TX/RX using a subframe period and offset allocated thereto through RRC signaling by applying modulation and a coding rate according to MCS information to TX/RX. When the UE receives a PDCCH that signals SPS release, the UE interrupts TX/RX. TX/RX interrupted in this manner may be resumed when the UE receives a PDCCH signaling activation (or reactivation) using a subframe period and offset assigned through RRC signaling according to RB allocation and MCS designated by the PDCCH.

PDCCH formats defined in 3GPP LTE include DCI format 0 for uplink and DCI formats 1, 1A, 1B, 1C, 1D, 2, 2A, 3, 3A, etc. for downlink. Control information such as a hopping flag, RB allocation, MCS (modulation coding scheme), RV (redundancy version), NDI (new data indicator), TPC (transmit power control), cyclic shift DMRS (demodulation reference signal), UL index, CQI (channel quality information) request, DL assignment index, HARQ process number, TPMI (transmitted precoding matrix indicator), PMI (precoding matrix indicator) confirmation, etc. is selected, combined and transmitted for purposes of the formats.

More specifically, when a PDCCH is used for SPS activation/release, this may validate that CRC of DCI transmitted on the PDCCH is masked with SPS C-RNTI and NDI is set to 0. In the case of SPS activation, a combination of bit fields is set to 0 and used as a virtual CRC, as shown in Table 6.

TABLE 6

|  | DCI format 0 | DCI format 1/1A | DCI format 2/2A/2B |
|---|---|---|---|
| TPC command for scheduled PUSCH | set to '00' | N/A | N/A |
| Cyclic shift DMRS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The virtual CRC has additional error detection capability by checking whether a corresponding bit field value is an appointed value when an error that cannot be checked even with a CRC is generated. When a specific UE cannot detect an error generated in DCI allocated to another UE and misrecognizes the error as SPS activation thereof, the one-time error generates continuous problems because the specific UT continuously uses the corresponding resource. Accordingly, wrong detection of SPS is prevented using the virtual CRC.

In the case of SPS release, a bit field value is set as shown in Table 7 and used as a virtual CRC.

TABLE 7

|  | DCI format 0 | DCI format 1A |
|---|---|---|
| TPC command for scheduled PUSCH | set to '00' | N/A |
| Cyclic shift DMRS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '1111' |
| Redundancy version | N/A | set to '00' |
| Resource block assignment | N/A | Set to all '1's |

PDCCH Piggyback

In the case of 3GPP LTE (e.g. release-8) uplink transmission, to efficiently use a power amplifier of a UE, single carrier transmission having satisfactory peak-to-average power ratio (PAPR) or cubic metric (CM) properties that affect the performance of the power amplifier is maintained. That is, single carrier properties can be maintained through DFT-decoding of data to be transmitted in case of PUSCH transmission in LTE. In case of PUCCH transmission, single carrier properties can be maintained by embedding information in a sequence having the single carrier properties and transmitting the sequence. However, the single carrier properties are not maintained when DF-decoded data is non-continuously allocated in the frequency domain or a PUSCH and a PUCCH are simultaneously transmitted.

Figure 16:
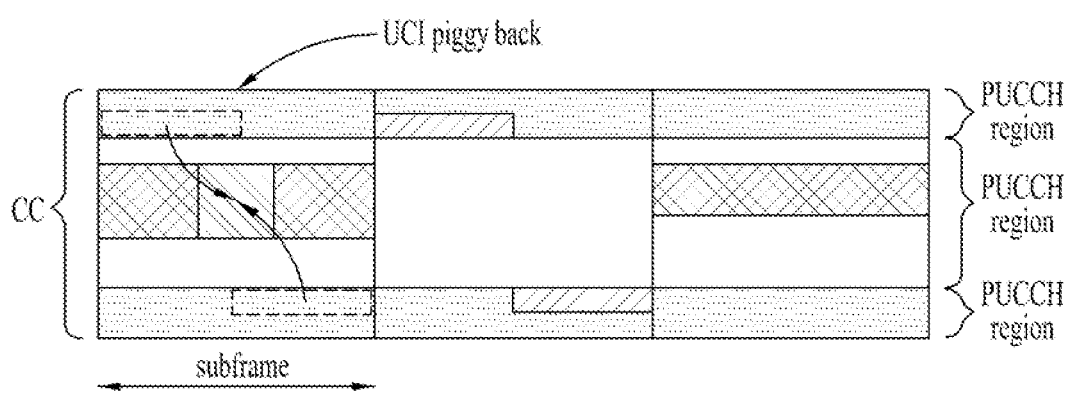
FIG. 16 illustrates a method for transmitting uplink control information through a PUSCH.

Accordingly, when a PUSCH is transmitted in the same subframe in which a PUCCH is transmitted, as shown in FIG. 16, uplink control information (UCI) to be transmitted on the PUCCH is piggybacked through the PUSCH along with data in order to maintain the single carrier properties.

As described above, since legacy LTE UEs cannot simultaneously transmit a PUCCH and a PUSCH, a method of multiplexing UCI (CQI/PMI, HARQ-ACK, RI, etc.) to a PUSCH region in a subframe in which the PUSCH is transmitted is used. For example, when CQI and/or PMI need to be transmitted in a subframe allocated for PUSCH transmission, UL-SCH data and CQI/PMI are multiplexed prior to DFT-spreading such that the control information and data can be simultaneously transmitted. In this case, UL-SCH data is rate-matched in consideration of CQI/PMI. Control information such as HARQ-ACK, RI, etc. can be multiplexed to a PUSCH region by puncturing the UL-SCH data.

Figure 17:
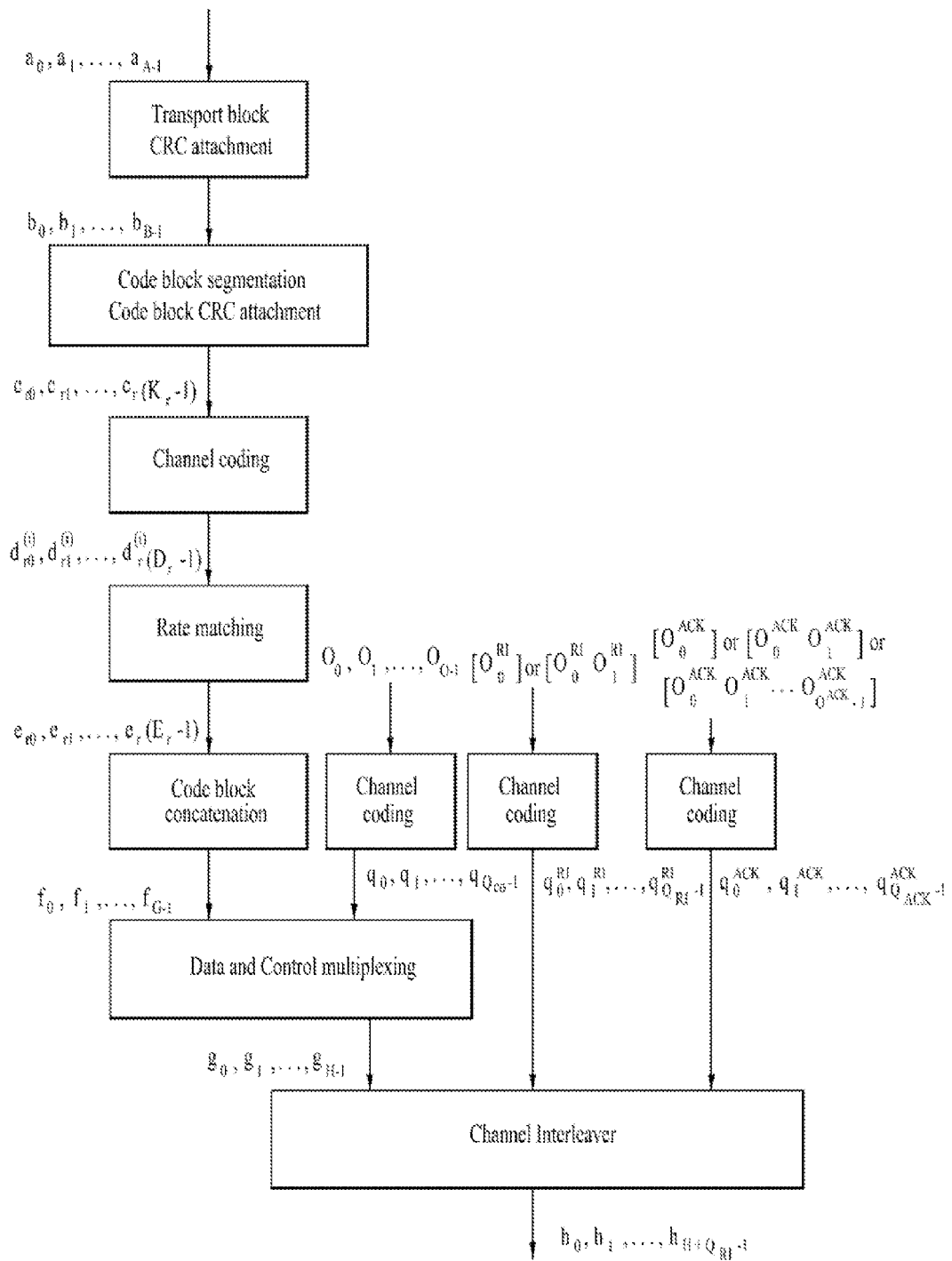
FIG. 17 illustrates multiplexing of uplink data and control information.

FIG. 17 illustrates a process of multiplexing data to be transmitted on uplink and control information.

Referring to FIG. 17, data multiplexed with control information is subjected to a process of attaching a cyclic redundancy check (CRC) for a transport block (TB) to a TB ($a_0, a_1, \ldots, a_{A-1}$), dividing the TB into several code blocks (CBs) based on TB size and attaching a CRC for the CBs to the CBs. Channel coding is performed on the result value. The channel-coded data is subjected to rate matching, and then the CBs are combined and multiplexed with a control signal.

CQI/PMI ($o_0, o_1, \ldots, o_{o-1}$) is subjected to channel coding, separately from the data. The channel-coded CQI/PMI is multiplexed with the data. The data multiplexed with the CQI/PMI is input to a channel interleaver.

Rank information (RI) ($[o_0^{RI}]$ or $[o_0^{RI} o_1^{RI}]$) is also subjected to channel coding separately from the data. The channel-coded RI is inserted into part of an interleaved signal through processing such as puncturing.

ACK/NACK ($[o_0^{ACK}]$ or $[o_0^{ACK} o_1^{ACK}] \ldots$) is subjected to channel coding separately from the data, CQI/PMI and RI. The channel-coded ACK/NACK is inserted into part of the interleaved signal through processing such as puncturing.

PDCCH Processing

When PDCCHs are mapped to REs, control channel elements (CCEs) corresponding to contiguous logical allocation units, are used. A CCE includes a plurality of (e.g. 9) REGs and an REG includes 4 neighboring REs except for an RS.

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 8.

TABLE 8

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 9.

TABLE 9

| Search space | | The number of |
|---|---|---|
| Aggregation level | Size (CCE unit) | PDCCH candidates |
| UE-specific 1 | 6 | 6 |
| 2 | 12 | 6 |
| 4 | 8 | 2 |
| 8 | 16 | 2 |
| Common 4 | 16 | 4 |
| 8 | 16 | 2 |

As shown Table 9, the UE has a plurality of search spaces at each aggregation level because 4 aggregation levels are present. The search spaces may be divided into a UE-specific search space and a common search space, as shown in Table 9. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The UE attempts to decode a search space, as described above. The number of decoding attempts is determined by DCI format and transmission mode determined through RRC signaling. When carrier aggregation is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation is not applied.

e-PDCCH

While control information included in the above-described DCI formats is transmitted through a PDCCH defined in LTE/LTE-A in the above description, the control information can also be transmitted through a downlink control channel other than the PDCCH, for example, an extended PDCCH (e-PDCCH) or a relay-PDCCH (R-PDCCH). The e-PDCCH is an extended form of a control channel carrying DCI for a UE and may be used to effectively support inter-cell interference control (ICIC), CoMP, MU-MIMO, etc. The R-PDCCH is a control channel carrying DCI for a relay.

The e-PDCCH and R-PDCCH are discriminated from the PDCCH in that the e-PDCCH and R-PDCCH are allocated to time-frequency resource regions other than regions defined for PDCCH transmission in LTE-LTE-A. For example, the R-PDCCH can be transmitted in an eNB-to-RN transmission region (refer to 1022 of FIG. 8), as described above with reference to FIG. 8. The e-PDCCH is transmitted in a conventional data region (refer to FIG. 3).

Figure 18:
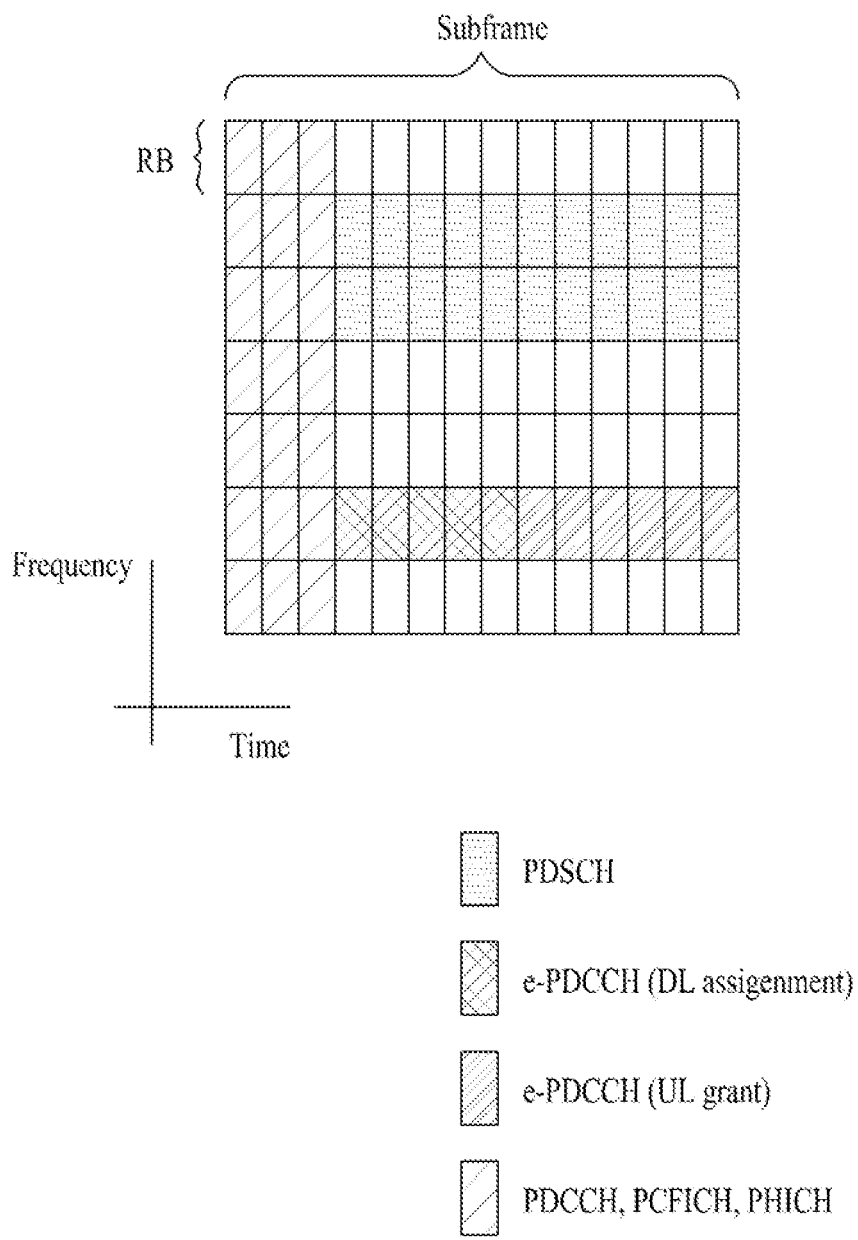
FIG. 18 illustrates e-PDCCH resource element mapping.

FIG. 18 is a diagram illustrating mapping of e-PDCCHs to resource elements. The same description is applicable to the R-PDCCH.

As shown in FIG. 18, e-PDCCHs can be transmitted in a data region (corresponding to a region other than PDCCH, PCFICH and PHICH regions of FIG. 18) of a downlink subframe in the time domain and transmitted on a set of semi-statically allocated resource blocks (RBs) in the frequency domain. An e-PDCCH carrying DCI for downlink (DL) assignment may be mapped to a first slot and an e-PDCCH carrying DCI for uplink (UL) assignment may be mapped to a second slot. A PDSCH can be mapped to the first and second slots in a specific frequency region of a data region of a downlink subframe.

Since the e-PDCCH and/or R-PDCCH are allocated to time-frequency resource regions different from a region to which the PDCCH is allocated, as described above, it is necessary to newly set a search space for the e-PDCCH and/or R-PDCCH, which is different from the search space for the PDCCH.

In the following description, a PDCCH transmitted in a region (e.g. the data region of FIG. 3) other than the conventional PDCCH transmission region, such as the e-PDDCH or R-PDCCH, are called an e-PDCCH. That is, the principle of the present invention, explained based upon the e-PDCCH, is equally applicable to the R-PDCCH and a new PDCCH.

Search Space for an e-PDCCH

Since cross-interleaving may be applied to mapping of an e-PDCCH to an RE or not, a new search space in consideration of whether or not cross-interleaving is applied to mapping of an e-PDCCH to an RE needs to be set.

Figure 19:
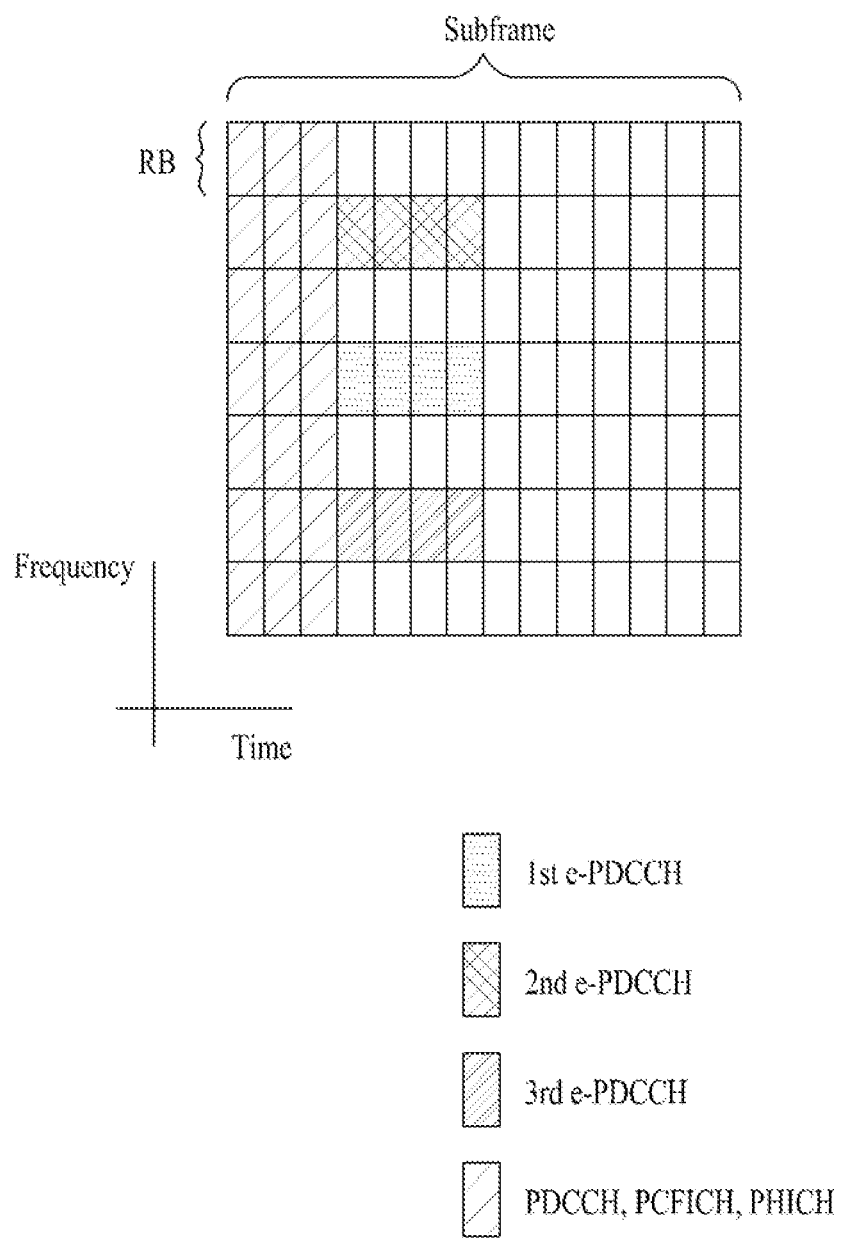
FIG. 19 illustrates an example to which e-PDCCH cross interleaving is not applied.
Figure 20:
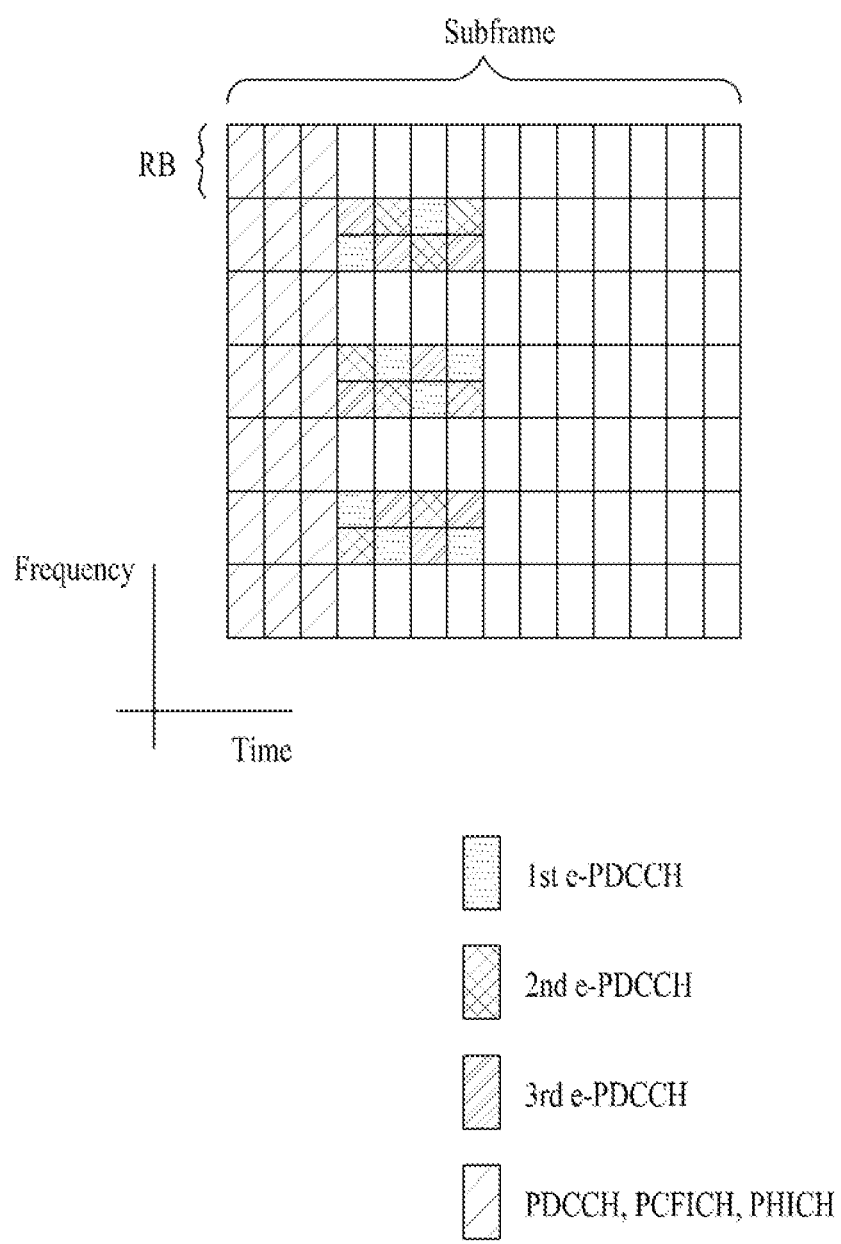
FIG. 20 illustrates an example to which e-PDCCH cross interleaving is applied.

FIG. 19 illustrates an example to which e-PDCCH cross-interleaving is not applied and FIG. 20 illustrates an example to which e-PDCCH cross-interleaving is applied. The description of FIGS. 19 and 20 is applicable to the R-PDCCH.

As shown in FIG. 19, when cross-interleaving is not applied, an e-PDCCH can be mapped to a specific set of RBs and the number or RBs of the set can correspond to an aggregation level of 1, 2, 4 or 8. Another e-PDCCH is not transmitted in the specific RB set.

Referring to FIG. 20, when cross-interleaving is applied, a plurality of e-PDCCHs is multiplexed and interleaved to be mapped to RBs allocated for e-PDCCH transmission. That is, a plurality of e-PDCCHs is mapped to a specific RB set.

An RS that can be used for e-PDCCH demodulation can be determined according to whether or not cross-interleaving is applied. For example, when e-PDCCH cross-interleaving is applied, the same resource RBs are shared for transmission of a plurality of e-PDCCHs and thus only a CRS can be used for e-PDCCH demodulation. This is because the CRS is commonly used in a cell even if the e-PDCCHs are received by different UEs. In other words, in the case of e-PDCCH cross-interleaving, a UE-specific DMRS cannot be used for e-PDCCH demodulation. When e-PDCCH cross-interleaving is not applied, the CRS or DMRS can be used for e-PDCCH demodulation.

Figure 21:
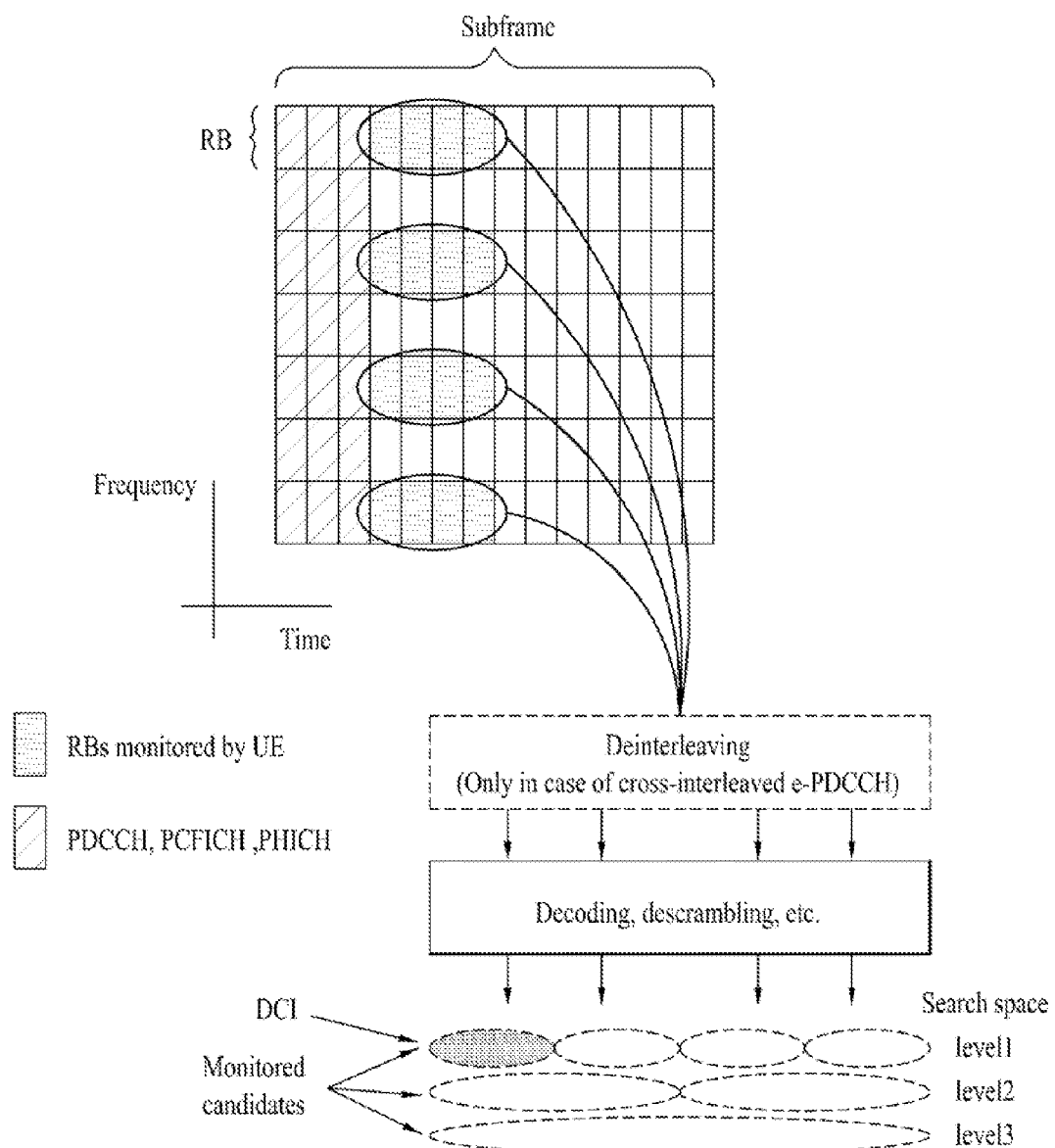
FIG. 21 illustrates e-PDCCH blind decoding.

FIG. 21 is a diagram illustrating e-PDCCH blind decoding. A set of e-PDCCH candidates is monitored by a UE in the case of both cross-interleaving and non-cross-interleaving. An RB set monitored by the UE may be set by signaling the RB set (or virtual resource block (VRB) set) using resource allocation types 0, 1 and 2 by an eNB. Resource allocation type 0 corresponds to resource allocation per resource block group (RBG) (an RBG is composed of a predetermined number of contiguous PRBs). Resource allocation type 1 corresponds to a scheme of grouping all RBGs into RBG subsets and allocating PRBs to a UE in a selected RBG subset. Resource allocation type 2 corresponds to a scheme of allocating VRBs instead of directly allocating PRBs and mapping the VRBs to PRBs. A VRB is a logical resource, whereas a PRB is a physical resource. VRB indices may be one-to-one mapped to PRB indices and a VRB-to-PRB mapping relationship may be determined according to a predetermined rule.

The same RB (or VRB) set or different RB (or VRB) sets may be used for UEs for e-PDCCH monitoring. In a subframe configured for e-PDCCH transmission, a UE can attempt to receive and decode each e-PDCCH candidate. If the UE detects DCI in a search space, the DCI can be used for downlink reception or uplink transmission. An e-PDCCH blind decoding process may be similar to normal PDCCH blind decoding except for setting of a search space. In the case of e-PDCCH, the number of e-PDCCH decoding attempts performed by the UE can be 2×2× (6+6+2+2)=64, considering that an e-PDCCH can be transmitted in a first slot or a second slot, when the numbers of e-PDCCH candidates are 6, 6, 2 and 2 respectively for aggregation levels 1, 2, 4 and 8, as in the UE-specific search space of Table 9, and two DCI sizes are considered for the e-PDCCHs, that is, 2×(6+6+2+2)=32.

While channel estimation for PDCCH demodulation is based on a CRS transmitted in the same region in which a PDCCH is transmitted, channel estimation for e-PDCCH demodulation may be based on the CRS or not, as described above. Table 10 shows an RS (referred to as an e-PDCCH RS hereinafter) used for e-PDCCH demodulation and an RS (i.e. PDSCH RS) used for PDSCH demodulation. Table 10 does not show a case in which a DMRS is used as the e-PDCCH RS and a CRS is used for PDSCH demodulation because no use of beamforming using the DMRS for a PDSCH is not desirable when beamforming using the DMRS is used for an e-PDCCH. That is, it is advantageous to apply the same precoding to the e-PDCCH and PDSCH.

TABLE 10

| e-PDCCH RS | PDSCH RS | e-PDCCH mapping scheme |
|---|---|---|
| CRS | CRS | Cross-interleaving or non-cross-interleaving |
| CRS | DMRS | Cross-interleaving or non-cross-interleaving |
| DMRS | DMRS | Non-cross-interleaving |

Whether or not cross-interleaving is applied and/or which RS is used as the e-PDCCH RS can be set through higher layer signaling (e.g. RRC signaling). A search space can be defined based on whether or not cross-interleaving is applied to the e-PDCCH and whether the e-PDCCH RS is the CRS or DMRS. In addition, when carrier aggregation is applied, a search space can be defined in consideration of whether or not cross-interleaving is applied to each carrier (or cell) and/or which RS is used as the e-PDCCH RS.

Table 11 shows a case in which different e-PDCCH RSs are set for carriers (or cells). The example of Table 11 assumes that cross-interleaving is applied when the CRS is used as the e-PDCCH RS.

TABLE 11

| Carrier (Cell) | e-PDCCH RS | Cross-interleaving | Search space (SS) VRB set |
|---|---|---|---|
| Cell 1 | CRS | ON | 2 sets (DL, UL) |
| Cell 2 | DMRS | Not applied | 1 set (DL + UL) |

In the example of Table 11, when a CRS based cross-interleaved e-PDCCH is configured for cell 1, an e-PDCCH search space (SS) can be set to two VRB sets, that is, a VRB set (e.g. a potential e-PDCCH transmission position for DL assignment) in a first slot and a VRB set (e.g. a potential e-PDCCH transmission position for UL grant) in a second slot. When an SS is set to VRBs, PRB positions conform to a VRB-PRB mapping rule, which will be described below in detail.

In the example of Table 11, when a DMRS based e-PDCCH is configured for cell 2, cross-interleaving is not applied and the e-PDCCH SS can be set to a single VRB set because the same VRB set for potential e-PDCCH transmission is configured in the first slot and the second slot when cross-interleaving is not applied.

An e-PDCCH SS (e.g. a set of VRBs for potential e-PDCCH transmission) can be set for a UE through higher layer signaling. That is, when two VRB sets are set, two higher layer signals (or a higher layer signal including two higher layer signaling parameters) can be used.

If the e-PDCCH RS is set to the DMRS for all carriers or the e-PDCCH RS is set to the CRS and unified cross-interleaving setup is applied to all carriers (i.e. cross-interleaving is applied to all carriers or not), e-PDCCH SSs for all carriers can be set using a single higher layer signal (or a higher layer signaling parameter). If not, configuration of an e-PDCCH SS needs to be signaled per carrier (or carrier group).

Table 12 shows a case in which different e-PDCCH RSs are set for carriers (or cells). Table 12 assumes that cross-interleaving is not applied when the CRS is used as the e-PDCCH RS.

TABLE 12

| Carrier (Cell) | e-PDCCH RS | Cross-interleaving | Search space (SS) VRB set |
|---|---|---|---|
| Cell 1 | CRS | OFF | 1 set (DL + UL) |
| Cell 2 | DMRS | Not applied | 1 set (DL + UL) |

In the example of Table 12, an e-PDCCH SS can be set to a single VRB set because cross-interleaving is not applied although the CRS is set as the e-PDCCH RS for cell 1. When a DMRS based e-PDCCH is configured for cell 2, cross-interleaving is not applied and the e-PDCCH set can be set to a single VRB set. In this case, the e-PDCCH SS can be configured for each cell using a single higher layer signal (or higher layer parameter) only.

Furthermore, to reduce signaling overhead for e-PDCCH SS configuration, an e-PDCCH SS may be commonly set for all cells using a single higher layer signal (or higher layer parameter).

e-PDCCH SS Signaling e-PDCCH signaling may refer to signaling for indicating a VRB set in which potential e-PDCCH transmission is present. A plurality of e-PDCCH SS signals may correspond to a plurality of e-PDCCH SS configuration parameters included in a single higher layer signal or a plurality of higher layer signals respectively including e-PDCCH SS configuration parameters.

Overhead of higher layer signaling (e.g. RRC signaling) necessary for each cell may depend on whether the e-PDCCH RS corresponds to the CRS or DMRS for each carrier (or cell) and whether or not cross-interleaving is applied. In the above-mentioned examples of setting an e-PDCCH SS, it is necessary to independently signal a higher layer parameter for configuring a VRB set (e.g. SS for DL assignment) in the first slot and a higher layer parameter for configuring another VRB set (e.g. SS for UL grant) in the second slot only when e-PDCCH cross-interleaving is applied.

Accordingly, when carrier aggregation is applied, e-PDCCH SS signaling (or e-PDCCH configuration parameter) overhead can be determined by the number of cells to which cross-interleaving is applied and the number of cells to which cross-interleaving is not applied.

$$\text{Overhead} = \#\_cell\_non\text{-}cross\text{-}interleaving + \#\_cell\_cross\text{-}interleaving \times 2 \qquad [\text{Equation 16}]$$

As represented by Equation 16, e-PDCCH SS signaling overhead may correspond to the sum of the value obtained by multiplying the number of cells to which cross-interleaving is applied (#_cell_cross-interleaving) by 2 and the number of cells to which cross-interleaving is not applied (#_cell_non-cross-intereleaving). Here, the number of cells may be UE-specifically set and thus SS configuration signaling may be UE-specific. e-PDCCH SS signaling overhead is 1+1×2=3 in the example of Table 11 and 2+0×2=2 in the example of Table 12.

To reduce e-PDCCH signaling overhead, the present invention proposes a method of setting the same e-PDCCH RS for all carriers (or cells). For example, when the e-PDCCH RS is set to the DMRS for all cells, configuration of SSs for DL assignment and UL grant in all cells can be designed using a single RRC signal.

When the e-PDCCH RS is set to the CRS for all cells, which signaling method is employed depends upon whether or not cross-interleaving is applied.

When cross-interleaving is not applied, a single e-PDCCH SS signal is needed per cell and thus e-PDCCH SS signaling having as many signaling overheads as the number of cells can be performed. To reduce signaling overhead, a signal e-PDCCH SS signal may be used for all cells when the same e-PDCCH SS VRB set is configured for all cells.

When cross-interleaving is applied, two SS setting signals are needed per cell (an SS VRB set for DL assignment in the first slot and an SS VRB set for UL grant in the second slot need to be separately signaled when cross-interleaving is applied). To further reduce signaling overhead, a method of signaling a DL assignment SS VRB set in the first slot in all cells through an e-PDCCH SS signal and signaling a UL grant SS VRB set in the second slot in all cells through another e-PDCCH SS signal may be used. In other words, the same e-PDCCH SS (e.g. DL assignment SS VRB set) in the first slot can be configured for all cells and the same e-PDCCH SS (e.g. UL grant SS VRB set) in the second slot can be configured for all cells.

Figure 22:
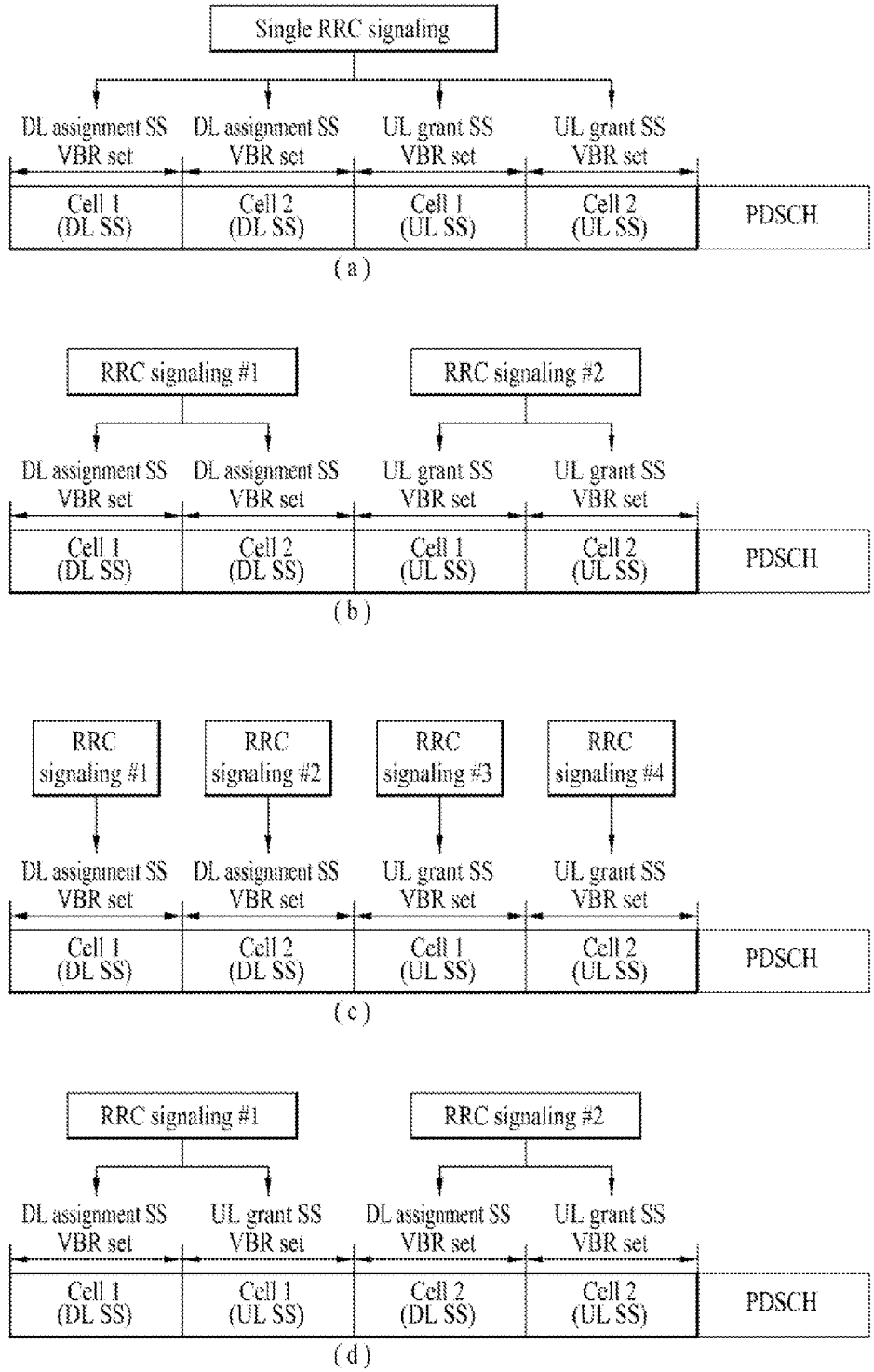
FIG. 22 illustrates examples of reducing e-PDCCH SS signaling overhead according to the present invention.

FIG. 22 is a diagram illustrating examples of reducing e-PDCCH SS signaling overhead according to the present invention. FIG. 22 shows various examples of reducing e-PDCCH SS configuration signaling overhead by signaling a common VRB set for a plurality of cells. In FIG. 22, VRB sets other than VRB sets to which DL/UL SSs for a plurality of cells are configured may be set to VRB sets for PDSCH transmission. The order and size of SSs in FIG. 22 are exemplary and various VRB set sizes can be set in various positions.

FIG. 22(*a*) illustrates an e-PDCCH SS configuration signaling scheme without discriminating between cells or DL/UL SSs. For example, configuration of a common VRB set for DL assignment SSs (e.g. VRB sets in the first slot for potential e-PDCCH transmission) and UL grant SSs (e.g. VRB sets in the second slot for potential e-PDCCH transmission) in cell 1 and cell 2 can be signaled to a UE using a single RRC signal. While FIG. 22(*a*) may correspond to a case in which cross-interleaving is not applied and the CRS or DMRS is used as the e-PDCCH RS in both cell 1 and cell 2, the present invention is not limited thereto.

FIG. 22(*b*) illustrates a signaling scheme that discriminates a DL SS from a UL SS without discriminating between cells. For example, configuration of a common VRB set for DL assignment SSs in cell 1 and cell 2 can be signaled to a UE using RRC signaling #1 and configuration of a common VRB set for UL grant SSs in cell 1 and cell 2 can be signaled to the UE using RRC signaling #2. While FIG. 22(*b*) may correspond to a case in which cross-interleaving is applied and the CRS is used as the e-PDCCH RS in both cell 1 and cell 2, the present invention is not limited thereto.

FIG. 22(*c*) illustrates a signaling scheme that discriminates a DL SS from a UL SS while discriminating between cells. For example, configuration of a DL assignment SS VRB set in cell 1 can be signaled to a UE using RRC signaling #1 and configuration of a DL assignment SS VRB set in cell 2 can be signaled to the UE using RRC signaling #2. In addition, configuration of a UL grant SS VRB set in cell 1 can be signaled to the UE using RRC signaling #3 and configuration of a UL grant SS VRB set in cell 2 can be signaled to the UE using RRC signaling #4. While FIG. 22(*c*) may correspond to a case in which cross-interleaving is applied and different e-PDCCH RSs are set for cell 1 and cell 2, the present invention is not limited thereto.

FIG. 22(d) illustrates a signaling scheme that discriminates between cells without discriminating a DL SS from a UL SS. For example, configuration of a common VRB set for a DL assignment SS VRB set and a UL grant SS in cell 1 can be signaled to a UE using RRC signaling #1 and configuration of a common VRB set for a DL assignment SS VRB set and a UL grant SS in cell 2 can be signaled to the UE using RRC signaling #2. While FIG. 22(d) may correspond to a case in which cross-interleaving is not applied and different e-PDCCH RSs are set for cell 1 and cell 2, the present invention is not limited thereto.

Schemes for configuring e-PDCCH SS VRB sets for a plurality of cells have been described. Here, even if a common VRB set is set as an e-PDCCH SS for the plurality of cells, different PRB sets may be configured for e-PDCCH SSs of the respective cells. Since the cells may have different center frequencies and different bandwidths or VRB-PRB mapping rules, PRB sets corresponding to e-PDCCH SSs of the cells, determined by the common VRB set, may differ. In addition, when a common VRB set is set for a plurality of cells through e-PDCCH SS signaling, the VRB set may be interpreted differently for the respective cells. For example, a PRB set in each cell, which is mapped to the common VRB set, can be determined by interpreting the common VRB set according to the index of the corresponding cell or a rule based on the cell index.

When signaling of a common VRB set for configuring e-PDCCH SSs is not applied to a plurality of cells, configuration of an e-PDCCH SS for each cell may be independently signaled. For example, when cells have different system bandwidths, the cells may have different VRB set sizes. In this case, it may be desirable to independently signal configuration of an e-PDCCH SS for each cell.

The above-described method of reducing signaling overhead by commonly applying a parameter (e.g. VRB set) for e-PDCCH SS configuration signaling to a plurality of cells in a carrier aggregation environment may be equally applied to the following parameters. For example, the above-described principle of the present invention can be applied to parameters related to setting of a specific time-frequency resource for a specific purpose (a specific time-frequency resource is used for potential e-PDCCH transmission in the above-described examples) from among parameters set by higher layer signaling (e.g. RRC signaling) for a UE supporting the e-PDCCH or a relay supporting the R-PDCCH in a system supporting carrier aggregation. Examples of these parameters are described below.

Parameter 'subframeConfigurationPatternFDD' is bitmap format information indicating a subframe configured for a specific UE or relay in the case of FDD. Parameter 'subframeConfigurationPatternTDD' is index information indicating a subframe for a specific UE or relay in the case of TDD. Parameter 'resourceAllocationType' is information indicating a resource allocation type with respect to e-PDCCH SS signaling and mapping. Parameter 'resourceBlockAssignment' is bitmap format information for e-PDCCH SS signaling. Parameter 'demodulationRS' is information indicating an RS used for e-PDCCH demodulation. Parameter 'pdsch-Start' is information indicating a symbol at which a PDSCH region starts. Parameter 'pucch-Config' is information indicating PUCCH ACK/NACK resource reservation by a higher layer.

The parameters set by RRC signaling for a plurality of cells may be dynamically applied according to whether the cells are activated or deactivated. For example, when a specific UE receives an RRC signal including an e-PDCCH SS parameter commonly applied to a plurality of cells, as described above, the parameter can be applied to an activated cell only. If cell 1, cell 2, cell 4 and cell 5 are set for a specific UE and only cell 1 and cell 4 are activated when the RRC signal is received, a common VRB set for e-PDCCH SSs can be applied to activated cell 1 and cell 4 other than deactivated cell 2 and cell 5.

In addition, the above-described method of reducing higher layer signaling overhead can be applied to UEs after initial access and cannot be applied to relays.

Search Space Configuration (VRB-PRB Mapping)

The above-described examples relate to methods of reducing signaling overhead when a parameter related to setting of a specific time-frequency resource for a specific purpose (e.g. setting of a specific time-frequency resource to a search space used for potential e-PDCCH transmission) is signaled to a UE through higher layer signaling in a system supporting carrier aggregation. In the following, examples of a method of mapping an e-PDCCH to a physical resource according to whether or not cross carrier scheduling (CCS) is applied in a carrier aggregation system are described.

CCS can be defined as transmission of DCI of a cell from among a plurality of serving cells through another cell. For example, when CCS is applied, DCI on SCell(s) can be transmitted through a PCell only. When CCS is not applied, DCI on a specific cell can be transmitted through the specific cell.

When CCS is applied, an e-PDCCH SS may be configured in a specific cell (e.g. PCell) and a VRB set for the cell may be signaled for e-PDCCH SS configuration. Otherwise, VRB sets (i.e. SS VRB sets) that define the SS may be mapped to PRB sets of the specific cell. Here, the SS may be configured based on whether or not e-PDCCH cross-interleaving is applied. For example, a DMRS based e-PDCCH SS can be configured when e-PDCCH cross-interleaving is not applied, whereas a CRS-based e-PDCCH SS can be configured when e-PDCCH cross-interleaving is applied.

When CCS is not applied, an e-PDCCH SS may be configured in a resource region occupied by each cell. To achieve this, a VRB set may be signaled per cell. Otherwise, an SS VRB set may be mapped to a PRB set of each cell. When cells have different system bandwidths, the cells may have different bit lengths for SS VRB set signaling. Although the number of SS VRBs configured per cell is not directly related to system bandwidth of the corresponding cell, resource regions corresponding to SSs may have different sizes when cells have different system bandwidths. Furthermore, when CCS is not applied, higher layer parameters (e.g. 'subframeConfigurationPatternFDD', 'subframeConfigurationPatternTDD', 'resourceAllocationType', 'resourceBlockAssignment', 'demodulationRS', 'pdsch-Start', 'pucch-Config', etc.) may be signaled per cell, similarly to an SS signaled per cell as described above.

A description will be given of various examples of mapping an e-PDCCH SS to a physical resource with reference to FIGS. 23 to 29. FIGS. 23 to 29 illustrate examples based on the assumption that five cells are set for a UE, cell 1 from among the five cells is set to a PCell, and cell 2, cell 3, cell 4 and cell 5 are set to SCells. In the examples shown in FIGS. 23 to 29, an SS is allocated to a logical unit (i.e. VRB set) and a PRB set to which a VRB set is mapped represents a physical time-frequency resource in which e-PDCCH can be transmitted.

In addition, in the examples of FIGS. 23 to 29, the order or positions of cell 1 SS, cell 2 SS, cell 3 SS, cell 4 SS and cell 5 SS mapped to time-frequency resources are exemplary and the present invention is not limited thereto. That is, it is apparent that SSs can be configured in an order or in resource positions different from those shown in FIGS. 23 to 29. FIGS. 23 to 29 show sequential configuration of SSs for the cells according to PRB indices for convenience of description and PRB indices mapped to SSs for the respective cells may be changed. In addition, the sizes and positions of DL assignment e-PDCCH SSs and/or UL grant e-PDCCH SSs in physical resource regions, shown in FIGS. 23 to 29, are exemplary and the scope of the present invention is not limited thereto.

Figure 23:
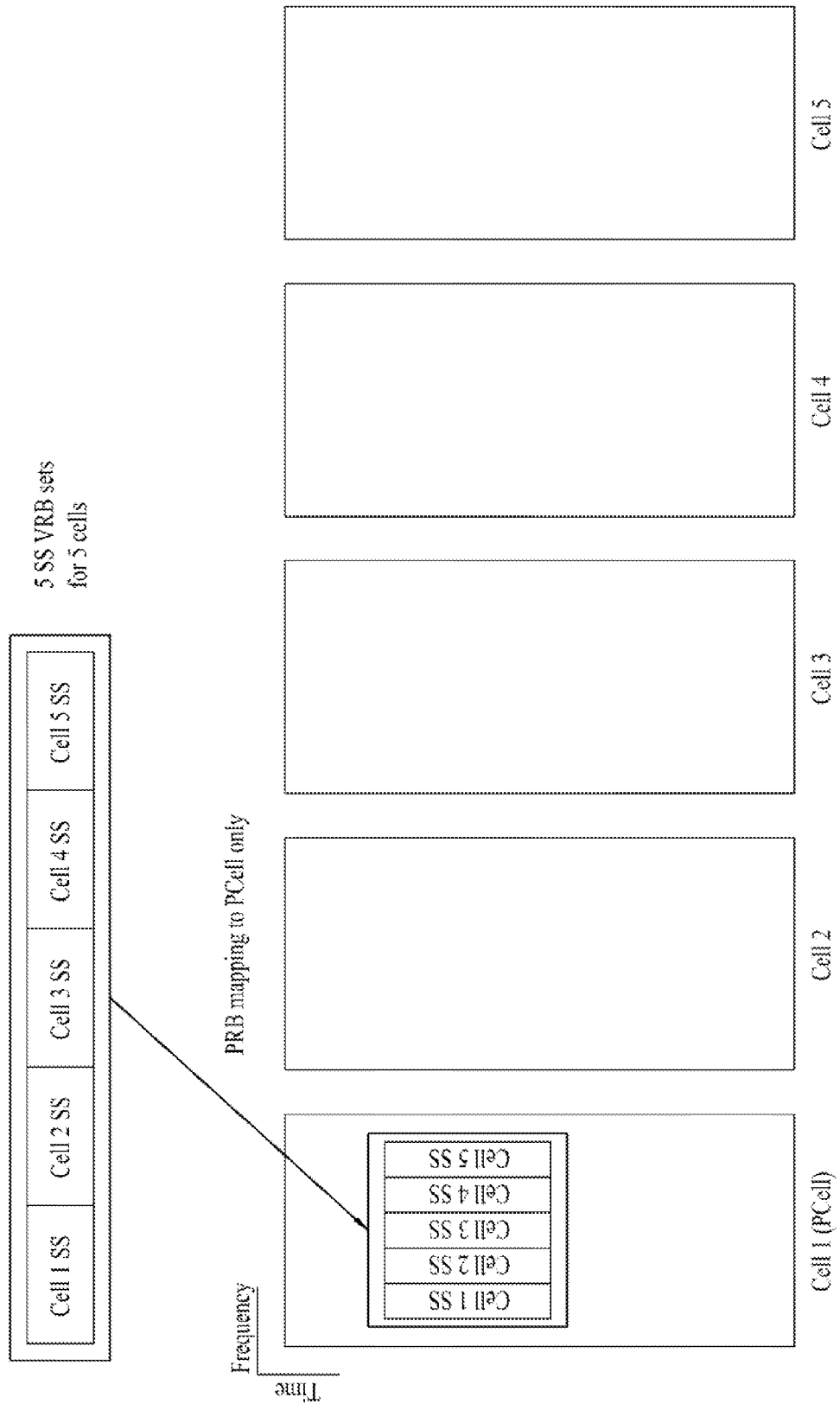
FIGS. 23 to 29 illustrate examples of mapping an e-PDCCH search space to a physical resource.

FIG. 23 illustrates an example of setting CRS based e-PDCCH SSs. FIG. 23 shows only DL assignment e-PDCCHs (or e-PDCCHs allocated to the first slot) in order to clearly present the principle of the present invention. In addition, when a CRS based e-PDCCH SS is configured, the method described in the following can be equally applied to both a case in which cross-interleaving is applied and a case in which cross-interleaving is not applied.

Since RBs or RBGs on which e-PDCCHs are transmitted have low correlation when the e-PDCCHs correspond to CRS based e-PDCCHs, e-PDCCHs for all cells can be present in the PCell. FIG. 23 shows that five SS VRB sets for the five cells are all mapped to PRBs of the PCell. That is, an SS for the PCell and SSs for the SCells are configured in the PCell and the UE can perform e-PDCCH blind decoding to acquire DL assignment scheduling information about each cell and demodulate a PDSCH transmitted in a resource region (PCell or SCell(s)) indicated by DL assignment.

Here, an SS may be configured per cell. When the SS VRB sets are respectively provided to the cells (i.e. when a VRB set defines only an SS for a specific cell), collision needs to be avoided during VRB-to-PRB mapping. For example, when a scheduler sets VRB index-to-PRB index mapping, a PRB set mapped to a VRB set for the PCell and a PRB set mapped to a VRB set for an SCell may not overlap. For example, if VRB indices and PRB indices have one-to-one mapping relationship, when SS VRB sets for the cells do not overlap, PRB sets mapped to the SS VRB sets do not overlap. If PRBs for the cells, in which e-PDCCHs are transmitted, do not overlap, a PRB (i.e. a physical resource region in which potential e-PDCCH transmission is present) corresponding to an SS may not be exclusively configured per cell. However, exclusive configuration of an SS per cell is desirable.

In addition, an SS may be shared by a plurality of cells. That is, regions in which e-PDCCHs for a plurality of cells can be transmitted can be shared instead of being respectively defined for the plurality of cells while the e-PDCCHs for the cells are not transmitted through the same physical resource. In this case, the SS may be configured using a single signal (signal defining an SS VRB set) and e-PDCCHs for all cells may be transmitted in the SS. For example, 10 VRBs can be defined as a shared SS and an e-PDCCH for a PCell and an e-PDCCH for an SCell can be blind-decoded in PRBs corresponding to the 10 VRBs. In this case, though blind decoding complexity does not increase since the SS resource region (resource region in which the UE needs to attempt blind decoding) or the number of e-PDCCH formats is not increased, the degree of freedom of e-PDCCH allocation may increase.

While the SSs for all cells are configured in the PCell in the example of FIG. 23, the present invention is not limited thereto. For example, e-PDCCH SSs for a plurality of cells may be configured in one of the plurality of cells. In addition, when transmission is not performed in a specific cell at a specific time (e.g. in a subframe) while the specific cell is set for a UE, a resource region of the cell, which corresponds to the specific time, may be set to e-PDCCH SSs of the cell and/or other cells.

Figure 24:
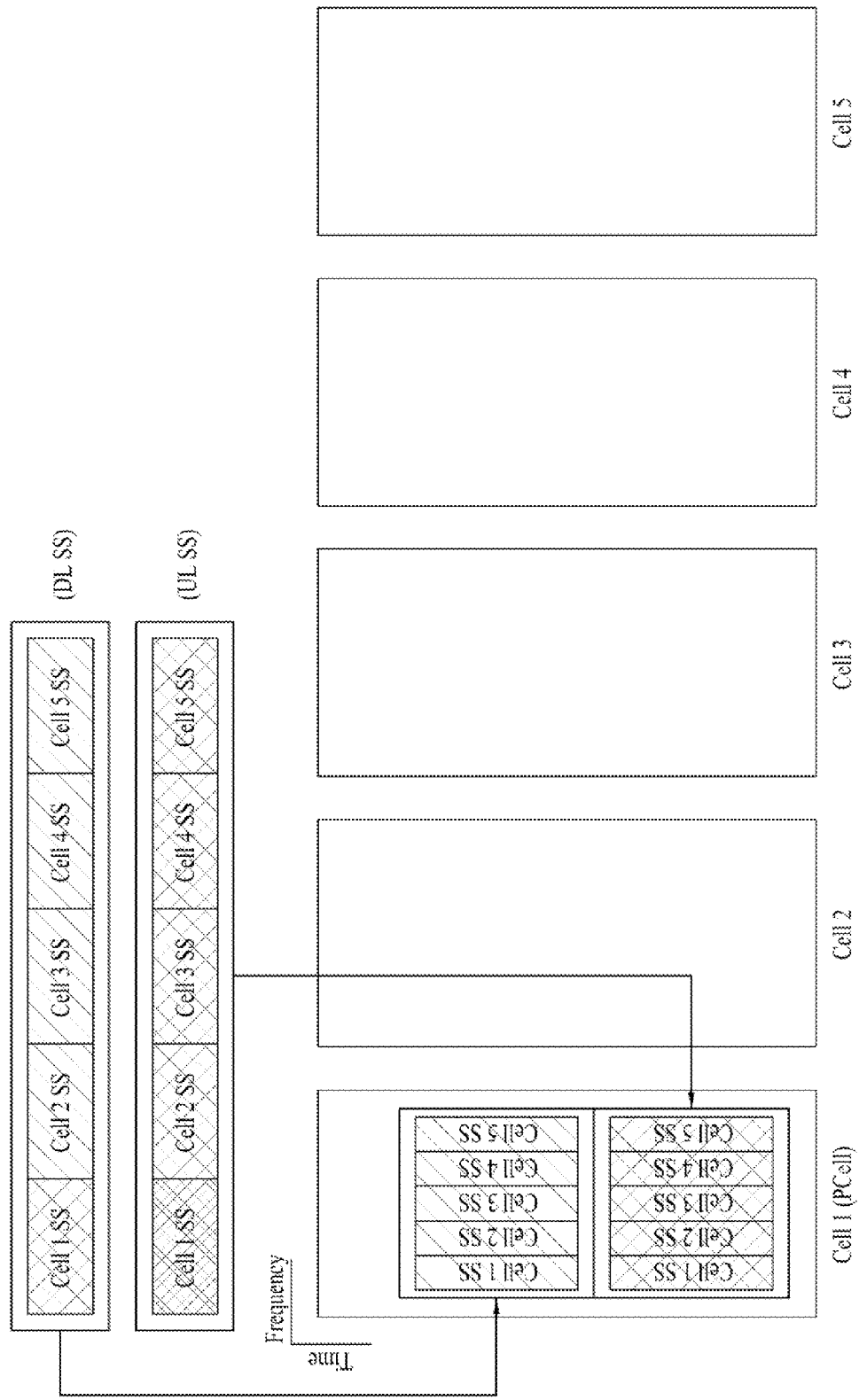

FIG. 24 illustrates a method of configuring UL grant e-PDCCH (or e-PDCCH allocated to the second slot) SSs in addition to the configuration of CRS based e-PDCCH SS shown in FIG. 23. The principle of the present invention described with reference to FIG. 23 can be equally applied to the UL grant e-PDCCH SSs.

Figure 25:
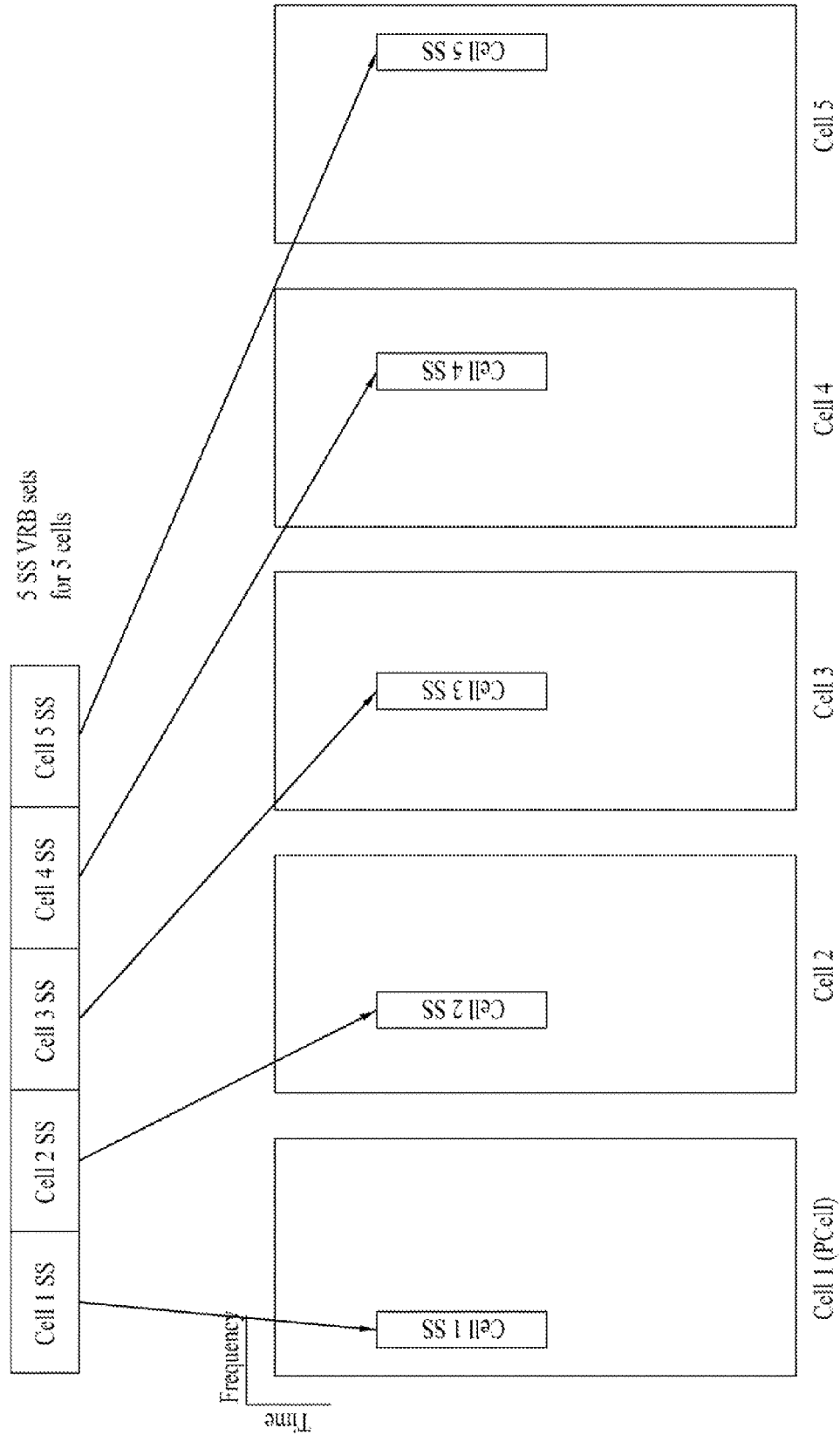

FIG. 25 illustrates an example of configuring DMRS based e-PDCCH SSs when cross-interleaving is not applied. FIG. 25 shows only DL assignment e-PDCCHs (or e-PDCCHs allocated to the first slot) in order to clearly present the principle of the present invention.

Transmission of a PDSCH in an RBG to which an e-PDCCH demodulated based on a DMRS is allocated and demodulation of the PDSCH based on the DMRS are advantageous in terms of frequency selective scheduling gain. Accordingly, a PRB corresponding to a DMRS e-PDCCH SS for each cell is preferably disposed in each cell.

Referring to FIG. 25, a VRB set can be allocated to each cell through higher layer signaling and an SS can be configured per cell. Physical resources respectively corresponding to SSs respectively mapped to VRB sets for cell 1, cell 2, cell 3, cell 4 and cell 5 can be respectively present in cell 1, cell 2, cell 3, cell 4 and cell 5.

Here, since e-PDCCHs can be simultaneously transmitted in a plurality of cells, an e-PDCCH for a cell and an e-PDCCH for another cell may interfere with each other. Though the influence of interference between e-PDCCHs is not severe because e-PDCCHs are present in OFDM symbols other than a PDCCH region (e.g. the control region of FIG. 3), inter-cell interference needs to be minimized. As an example of inter-cell coordination for e-PDCCH SS configuration, cell ID based SS hopping or shifting may be considered. SS hopping/shifting may be regarded as a method of determining a resource region that defines an SS by a cell ID and setting an SS resource region of a cell such that the SS resource region does not overlap with (or is orthogonal to) an SS resource region of another cell.

Furthermore, while e-PDCCH cross-interleaving is not applied when a DMRS based SS is configured, SSs for a plurality of cells may be disposed in a resource region of a specific cell (e.g. PCell). That is, in the case of a DMRS based e-PDCCH, SSs can be set in the same manner as the scheme shown in FIG. 23. For example, in VRB-to-PRB mapping, PRBs mapped to SS VRB sets configured for cells can all be present in the PCell. In this case, it is possible to configure and signal VRB sets for different cells in order to avoid overlap or collision between PRB sets mapped to the VRB sets. In addition, PRB sets mapped to SS VRB sets for some of a plurality of cells may be configured such that they overlap because decoding can be correctly performed if time-frequency resource regions do not overlap even though SSs overlap. In addition, an SS may be shared by a plurality of cells. In this case, a degree of freedom of e-PDCCH allocation can increase although blind decoding complexity does not increase.

Figure 26:
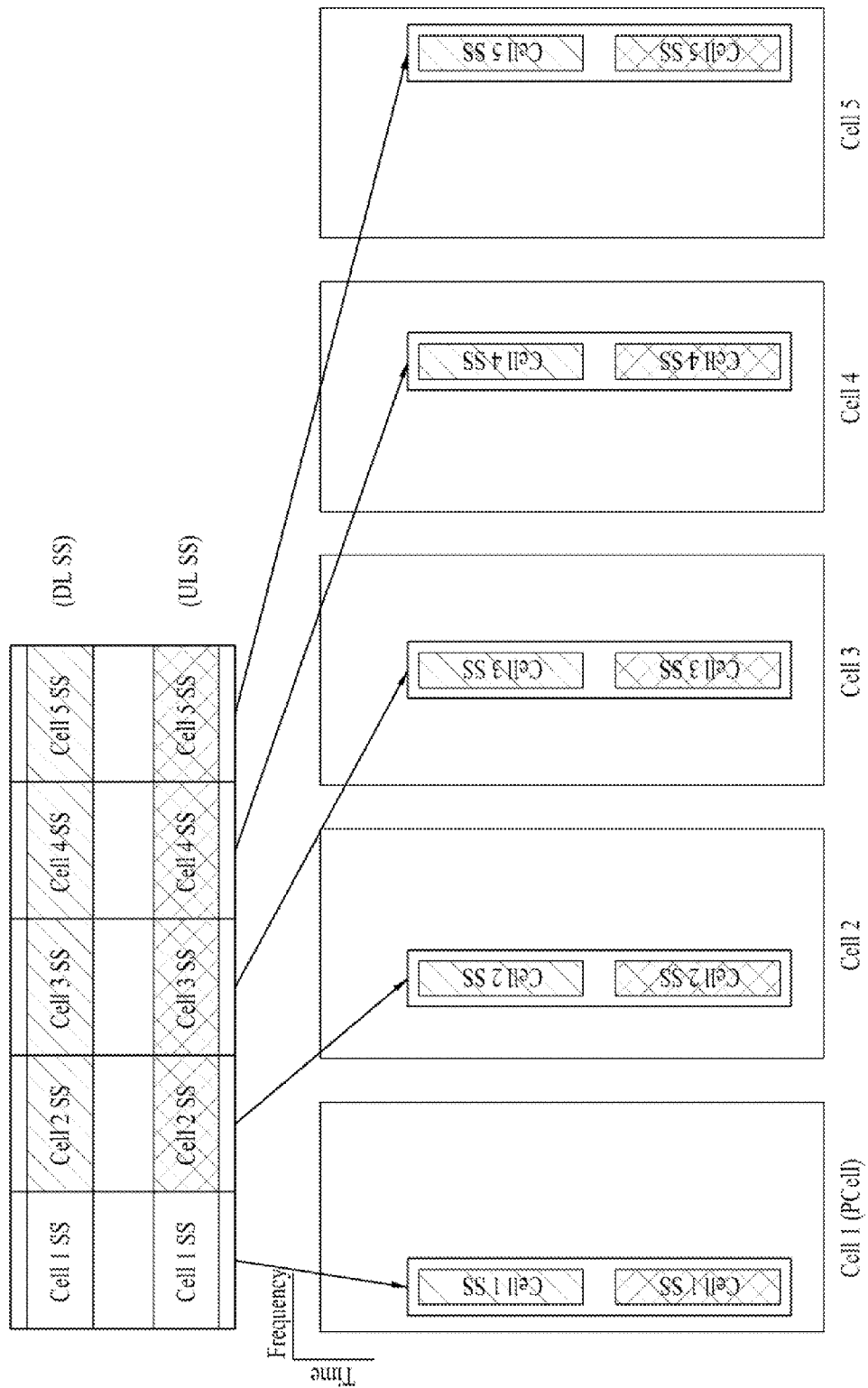

FIG. 26 illustrates a method of configuring UL grant e-PDCCH (or e-PDCCH allocated to the second slot) SSs in addition to configuration of DMRS based-PDCCH SSs shown in FIG. 25. The principle of the present invention, described with reference to FIG. 25, can be equally applied to UL grant e-PDCCHs.

Figure 27:
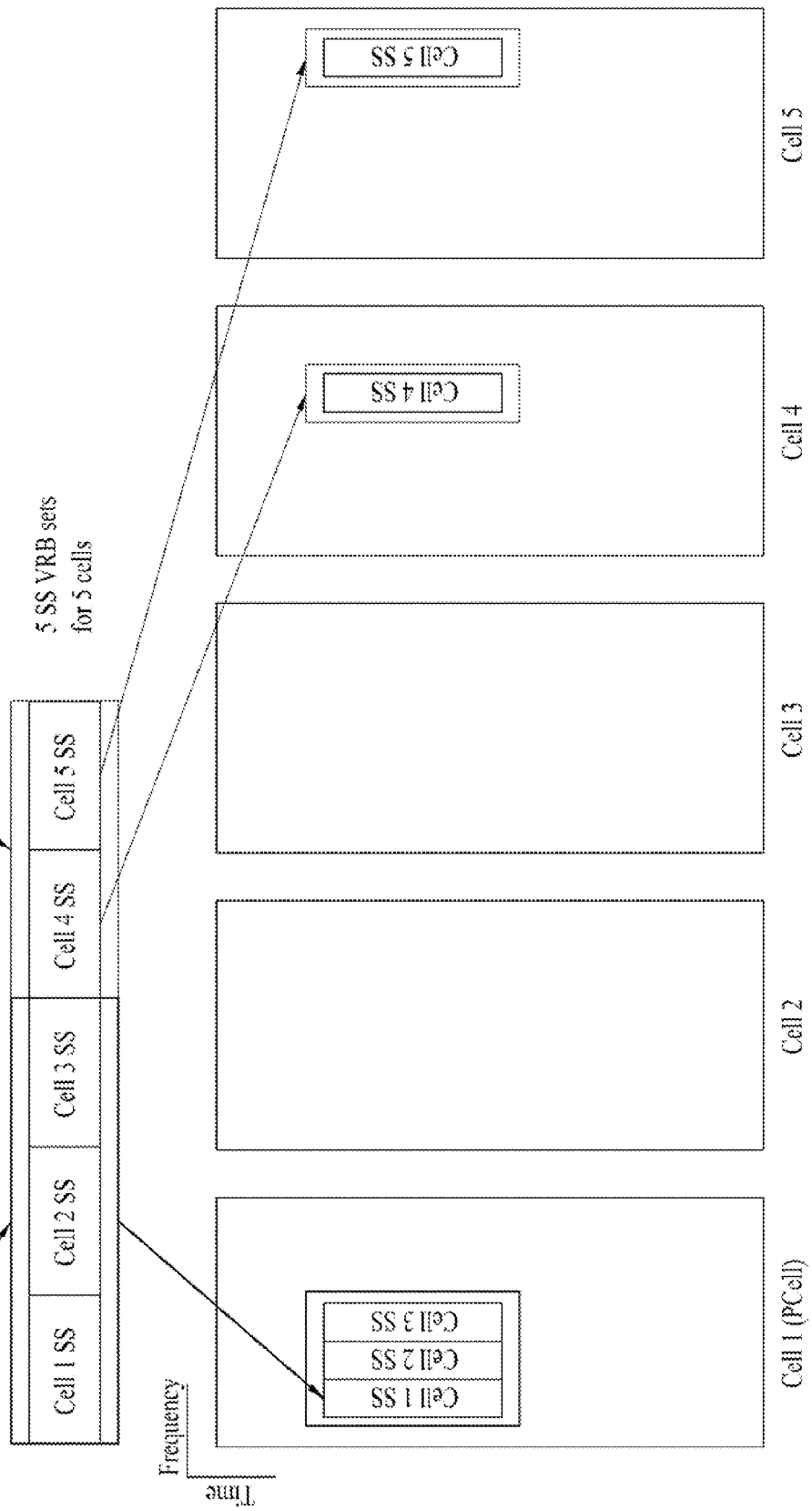

FIG. 27 illustrates an example of configuring SSs when e-PDCCHs having different attributes coexist. FIG. 27 shows only DL assignment e-PDCCHs (or e-PDCCHs allocated to the first slot) in order to clearly present the principle of the present invention.

Different RSs may be used for a UE to demodulate an e-PDCCH in respective cells. Even if a plurality of cells in which CRS based e-PDCCH demodulation is performed is present, the cells may employ different e-PDCCH mapping schemes (i.e. cross-interleaving may or may not be applied). As described above, CCS may or may not be applied on the basis of an e-PDCCH RS or according to e-PDCCH mapping scheme. Accordingly, whether an e-PDCCH SS for a cell is configured in the cell or a specific cell (e.g. PCell) can be determined based on an e-PDCCH RS or e-PDCCH mapping scheme of each cell.

For example, SSs for cells that support an e-PDCCH mapped through cross-interleaving can all be present in the PCell. SSs for cells that support an e-PDCCH mapped through non-cross-interleaving can be respectively set in the cells. Referring to FIG. 27, SSs for cell 1, cell 2 and cell 3 which support cross-interleaving are all present in cell 1 (PCell) and SSs for cell 4 and cell 5 which support non-cross-interleaving are respectively present in cell 4 and cell 5.

SSs for cells that support an e-PDCCH demodulated using a CRS can all be present in the PCell. SSs for cells that support an e-PDCCH demodulated using a DMRS can be respectively set in the cells. Referring to FIG. 27, SSs for cell 1, cell 2 and cell 3 that support CRS based e-PDCCH demodulation are all present in cell 1 (PCell) and SSs for cell 4 and cell 5 that support DMRS based e-PDCCH demodulation are respectively present in cell 4 and cell 5.

Setting SSs in the PCell in the case of an e-PDCCH demodulated based on the CRS and mapped through cross-interleaving and respectively setting SSs in corresponding cells in the case of an e-PDCCH demodulated based on the DMRS and mapped through non-cross-interleaving can be clearly determined in the above-described example. In the case of an e-PDCCH demodulated using the CRS and mapped through non-cross-interleaving, whether SSs are present in the PCell or respectively present in corresponding cells can be determined according to a predetermined rule. For example, an e-PDCCH mapping scheme or an e-PDCCH RS can be applied as a preferential standard and an SS setting scheme can be determined based on the standard.

Figure 28:
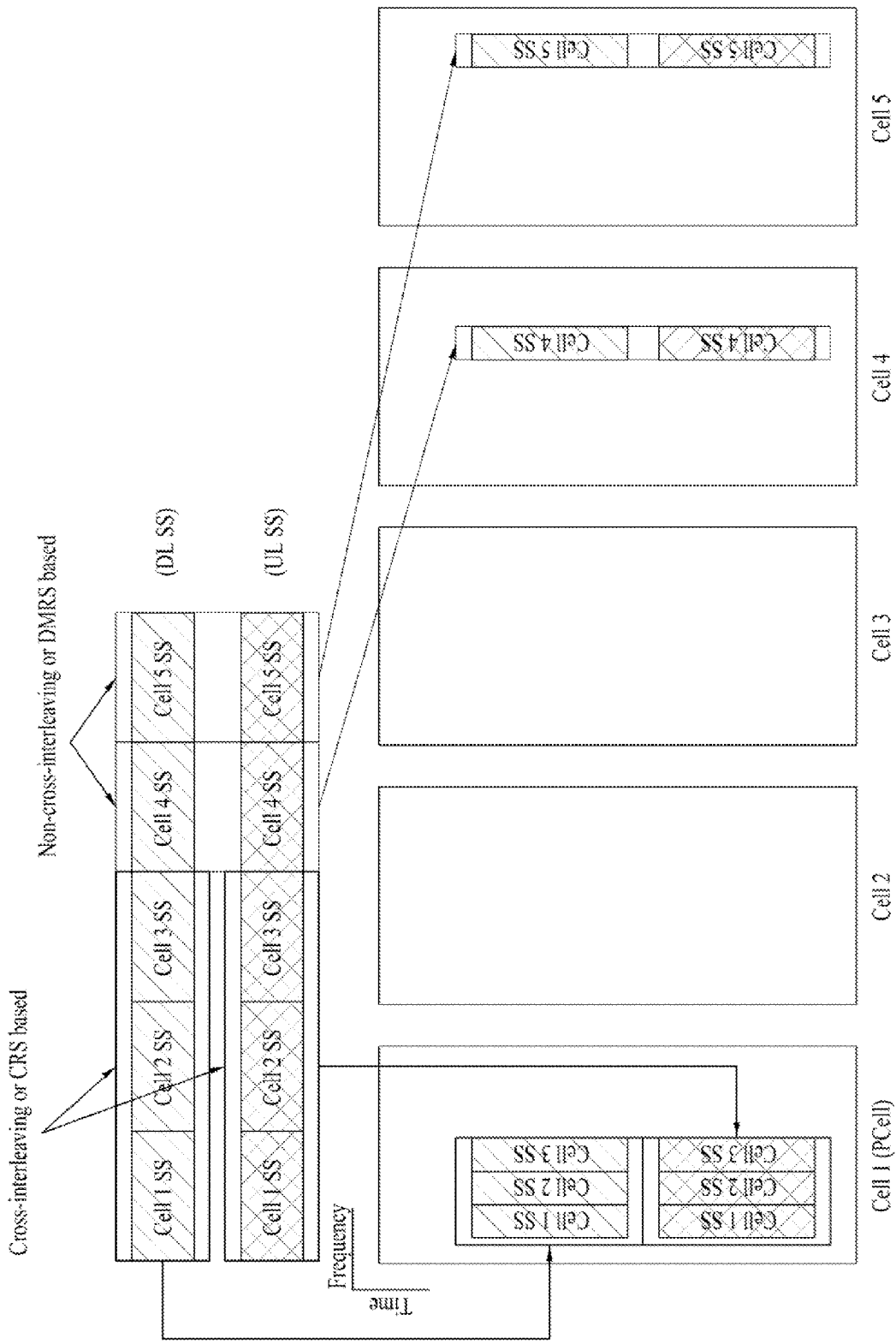

FIG. 28 illustrates a method of configuring UL grant e-PDCCH (or e-PDCCH allocated to the second slot) SSs in addition to configuration of SSs shown in FIG. 27. The principle of the present invention can be equally applied to the UL grant e-PDCCH.

Figure 29:
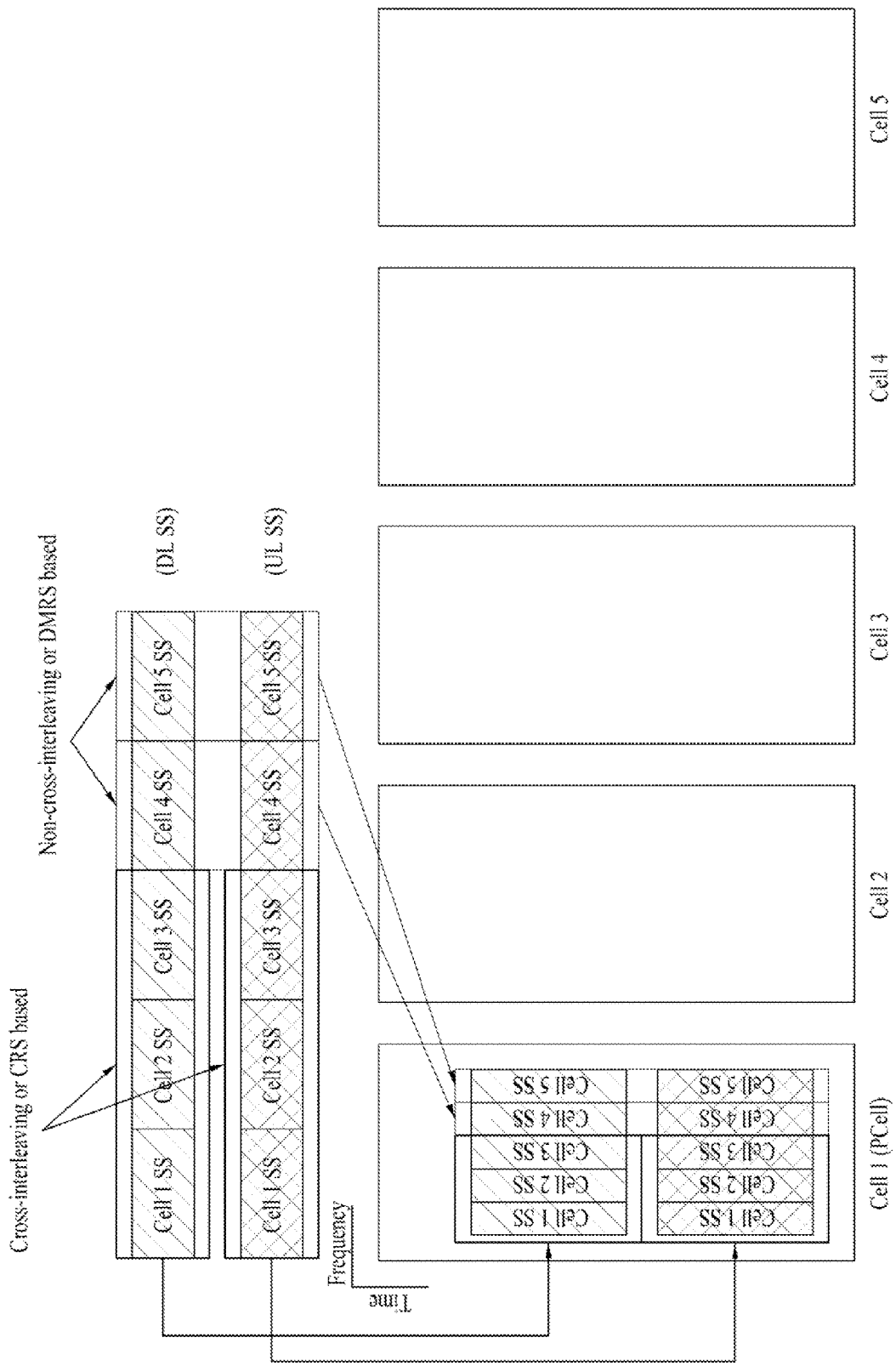

FIG. 29 illustrates an example of setting all e-PDCCH SSs in a specific cell (e.g. PCell) without discriminating e-PDCCH mapping schemes. That is, even when an e-PDCCH is mapped through non-cross-interleaving, SSs can be set in the PCell. Accordingly, an SS of an e-PDCCH mapped through non-cross-interleaving may be present in the PCell and a PDSCH scheduled by a blind-decoded e-PDCCH may be transmitted in an SCell. While the example of FIG. 29 can be advantageously applied when the CRS is used as an e-PDCCH RS, setting of SSs for all cells in the PCell when the DMRS is used as the e-PDCCH RS is not excluded.

Figure 30:
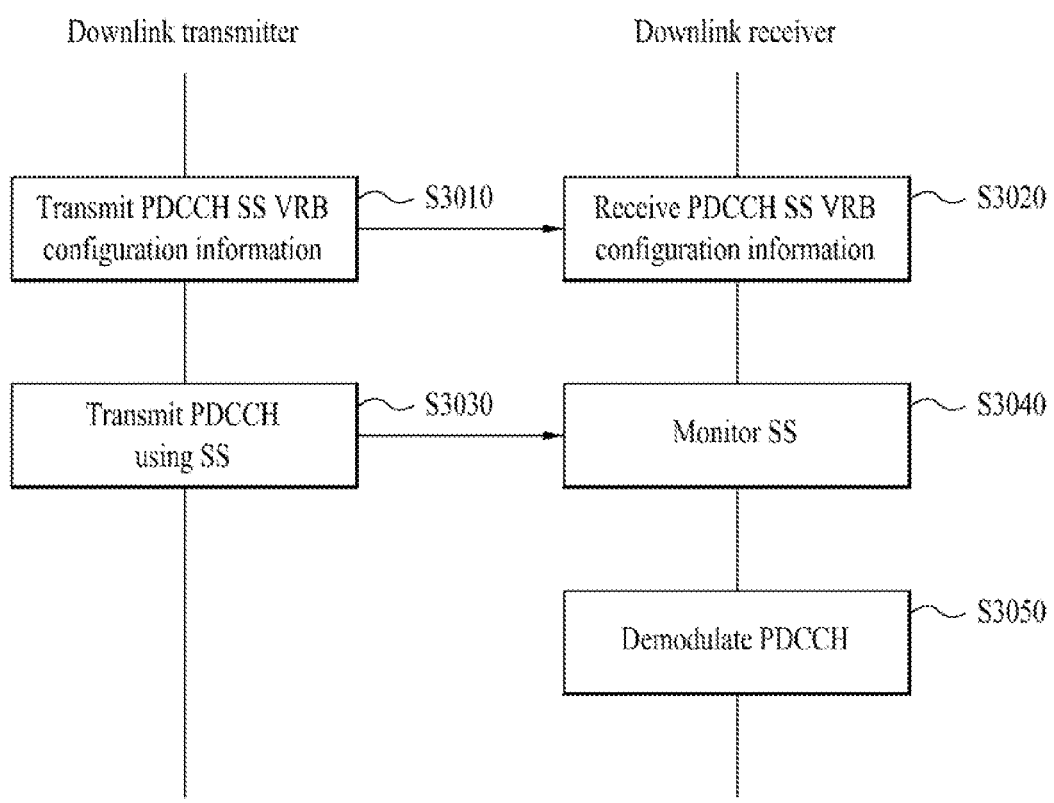
FIG. 30 is a flowchart illustrating a method for signaling configuration of an e-PDCCH search space and transmitting/receiving an e-PDCCH.

FIG. 30 is a flowchart illustrating a method for signaling configuration of a PDCCH SS and transmitting/receiving a PDCCH according to the present invention. The PDCCH described in FIG. 30 may correspond to an e-PDCCH or a PDCCH in a new format.

A downlink transmitter may set a PDCCH SS for a specific downlink receiver and transmit configuration information about a VRB set corresponding to the PDCCH SS to the downlink receiver in step S3010. The method for configuring the PDCCH SS VRB set can be determined based on whether or not cross-interleaving is applied to one or more cells and/or PDCCH RS type, as described in the above embodiments of the present invention, and thus description thereof is omitted. In addition, the method for signaling the PDCCH SS VRB set configuration information can be determined based on whether or not cross-interleaving is applied to one or more cells and/or PDCCH RS type, as described in the above embodiments of the present invention, and thus a description thereof is omitted.

The downlink receiver may receive the configuration information about the PDCCH SS VRB set in step S3020. The downlink receiver may determine the position of a resource (e.g. a specific PRB set of a specific cell) in which the downlink receiver monitors a PDCCH to be transmitted thereto on the basis of the PDCCH SS VRB configuration information.

The downlink transmitter may transmit the PDCCH through some or all resource regions in the SS in step S3030. The downlink receiver monitors PDCCH transmission in the SS in step S3040. That is, the downlink receiver can perform blind decoding based on the assumption of various PDCCH formats in the SS since the downlink receiver cannot be aware of a resource region in the SS, in which the PDCCH is transmitted.

The downlink receiver may demodulate the monitored PDCCH in step S3050. Accordingly, the downlink receiver can acquire downlink control information (e.g. DL assignment and/or UL grant scheduling information) on the downlink receiver.

The above-described embodiments of the present invention can be independently applied or two or more thereof can be simultaneously applied and description of redundant parts is omitted for clarity.

In description of various embodiments of the present invention, an eNB is exemplified as a downlink transmitter and a UE is exemplified as a downlink receiver. However, the present invention is not limited thereto. That is, the principle of the present invention, described through various embodiments of the present invention, can be equally applied when a relay is used as a downlink transmitter transmitting signals to a UE or an uplink receiver receiving signals from the UE or when the relay is used as an uplink transmitter transmitting signals to an eNB or a downlink receiver receiving signals from the eNB.

FIG. 31 illustrates configurations of a downlink transmitter and a downlink receiver according to the present invention.

Referring to FIG. 31, a downlink transmitter 3110 according to the present invention may include a reception module 3111, a transmission module 3112, a processor 3113, a memory 3114 and a plurality of antennas 3115. The antennas 3115 refer to a downlink transmitter supporting MIMO transmission and reception. The reception module 3111 may receive signals, data and information on uplink from a downlink receiver 3120. The transmission module 3112 may transmit signals, data and information on downlink to the downlink receiver 3120. The processor 3113 may control the overall operation of the downlink transmitter 3110.

The downlink transmitter 3110 according to an embodiment of the present invention may be configured to transmit a PDCCH (or e-PDCCH) to the downlink receiver 3120 for which one or more cells are set. The processor 3113 of the downlink transmitter 3110 may be configured to transmit information on configuration of a PDCCH SS (or a resource region for potential PDCCH transmission) through the transmission module 3112. In addition, the processor 3113 may be configured to transmit a PDCCH in all or some regions in the PDCCH SS through the transmission module 3112.

The processor 3113 of the downlink transmitter 3110 may process information received by the downlink transmitter 3110, information to be transmitted by the downlink transmitter 3110, etc. and the memory 3114 may store the processed information for a predetermined time and may be replaced by a component such as a buffer (not shown).

The downlink receiver 3120 according to the present invention may include a reception module 3121, a transmission module 3122, a processor 3123, a memory 3124 and a plurality of antennas 3125. The antennas 3125 refer to a downlink receiver supporting MIMO transmission and reception. The reception module 3121 may receive signals, data and information on downlink from the downlink transmitter 3110. The transmission module 3122 may transmit signals, data and information on uplink to the downlink transmitter 3110. The processor 3123 may control the overall operation of the downlink receiver 3120.

One or more cells may be configured for the downlink transmitter 3120 according to an embodiment of the present invention and the downlink transmitter 3120 may be configured to receive a PDCCH (or e-PDCCH). The processor 3123 of the downlink receiver 3120 may be configured to receive information on configuration of a PDCCH SS (or a resource region for potential PDCCH transmission) through the reception module 3121. In addition, the processor 3123 may be configured to monitor transmission of a PDCCH in the PDCCH SS and demodulate the PDCCH.

In addition, the processor 3123 of the downlink transmitter 3120 may process information received by the downlink receiver 3120, information to be transmitted by the downlink receiver 3120, etc. and the memory 3124 may store the processed information for a predetermined time and may be replaced by a component such as a buffer (not shown).

The configurations of the downlink transmitter 3110 and the downlink receiver 3120 may be implemented such that the above-described embodiments can be independently applied or two or more thereof can be simultaneously applied and description of redundant parts is omitted for clarity.

Description of the downlink transmitter 3110 in FIG. 31 may be equally applied to an eNB or a relay as a downlink transmitter or an uplink receiver. In addition, description of the downlink receiver 3120 in FIG. 31 may be equally applied to a UE or a relay as a downlink receiver or an uplink transmitter.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention can be applied to various mobile communication systems.

The invention claimed is:

1. A method for receiving a physical downlink control channel (PDCCH) by a downlink receiver for which one or more cells are set, the method comprising:
   receiving information on configuration of a virtual resource block (VRB) set for potential PDCCH transmission;
   monitoring the VRB set; and
   demodulating the PDCCH,
   wherein the information on the VRB set is defined for a plurality of cells when the information on configuration of the VRB set is an information related to a plurality of cells for which PDCCH non-cross-interleaving is set or a plurality of cells for which PDCCH demodulation based on a downlink receiver-specific reference signal is set, and
   wherein the information on the VRB set is defined such that information on a VRB set corresponding to a first slot of a downlink subframe is defined for the plurality of cells and information on a VRB set corresponding to a second slot of the downlink subframe is defined for the plurality of cells when the information on configuration of the VRB set is an information related to a plurality of cells for which PDCCH cross-interleaving is set or to a plurality of cells for which PDCCH demodulation based on a cell-specific reference signal is set.

2. The method according to claim 1, wherein downlink assignment scheduling information is transmitted through a PDCCH transmitted in the first slot of the downlink subframe and uplink grant scheduling information is transmitted through a PDCCH transmitted in the second slot of the downlink subframe.

3. The method according to claim 1, wherein the VRB set with respect to a cell for which PDCCH non-cross-interleaving is set or a cell for which PDCCH demodulation based on a downlink receiver-specific reference signal is set is mapped to a physical resource block (PRB) set in the corresponding cell.

4. The method according to claim 1, wherein the VRB set with respect to a cell for which PDCCH non-cross-interleaving is set or a cell for which PDCCH demodulation based on a cell-specific reference signal is set is mapped to a physical resource block (PRB) set in a predetermined cell.

5. The method according to claim 1, wherein the VRB set for the one or more cells is mapped to a physical resource block (PRB) set in a predetermined cell.

6. The method according to claim 4, wherein the predetermined cell is a primary cell (PCell).

7. The method according to claim 1, wherein the VRB set is a search space for the PDCCH.

8. The method according to claim 1, wherein the VRB set configuration information is transmitted through signaling of a layer higher than a physical layer.

9. The method according to claim 1, wherein the PDCCH corresponds to orthogonal frequency division multiplexing (OFDM) symbols of the downlink subframe, other than first N OFDM symbols,
wherein the PDCCH is a relay-PDCCH (R-PDCCH) or an extended-PDCCH (e-PDCCH), and
wherein $N \leq 3$.

10. A method for transmitting a physical downlink control channel (PDCCH) by a downlink transmitter to a downlink receiver for which one or more cells are set, the method comprising:
transmitting information on configuration of a virtual resource block (VRB) set for potential PDCCH transmission; and
transmitting the PDCCH using the VRB set,
wherein the information on the VRB set is defined for a plurality of cells when the information on configuration of the VRB set is an information related to a plurality of cells for which PDCCH non-cross-interleaving is set or a plurality of cells for which PDCCH demodulation based on a downlink receiver-specific reference signal is set, and
wherein the information on the VRB set is defined such that information on a VRB set corresponding to a first slot of a downlink subframe is defined for the plurality of cells and information on a VRB set corresponding to a second slot of the downlink subframe is defined for the plurality of cells when the information on configuration of the VRB set is an information related to a plurality of cells for which PDCCH cross-interleaving is set or to a plurality of cells for which PDCCH demodulation based on a cell-specific reference signal is set.

11. A downlink receiver receiving a physical downlink control channel (PDCCH), for which one or more cells are set, the downlink receiver comprising:
a reception module configured to receive a downlink signal from a downlink transmitter;
a transmission module configured to transmit an uplink signal to the downlink transmitter; and
a processor configured to control the reception module and the transmission module,
wherein the processor is further configured to:
receive information on configuration of a virtual resource block (VRB) set for potential PDCCH transmission through the reception module, and
monitor the VRB set, and
demodulate the PDCCH,
wherein the information on the VRB set is defined for a plurality of cells when the information on configuration of the VRB set is an information related to a plurality of cells for which PDCCH non-cross-interleaving is set or a plurality of cells for which PDCCH demodulation based on a downlink receiver-specific reference signal is set, and
wherein the information on the VRB set is defined such that information on a VRB set corresponding to a first slot of a downlink subframe is defined for the plurality of cells and information on a VRB set corresponding to a second slot of the downlink subframe is defined for the plurality of cells when the information on configuration of the VRB set is an information related to a plurality of cells for which PDCCH cross-interleaving is set or to a plurality of cells for which PDCCH demodulation based on a cell-specific reference signal is set.

12. A downlink transmitter transmitting a physical downlink control channel (PDCCH) to a downlink receiver for which one or more cells are set, the downlink transmitter comprising:
a reception module configured to receive an uplink signal from a downlink receiver;
a transmission module configured to transmit a downlink signal to the downlink receiver; and
a processor configured to control the reception module and the transmission module,
wherein the processor is further configured to:
transmit information on configuration of a VRB set for potential PDCCH transmission through the transmission module, and
transmit the PDCCH using the VRB set through the transmission module,
wherein the information on the VRB set is defined for a plurality of cells when the information on configuration of the VRB set is an information related to a plurality of cells for which PDCCH non-cross-interleaving is set or a plurality of cells for which PDCCH demodulation based on a downlink receiver-specific reference signal is set, and
wherein the information on the VRB set is defined such that information on a VRB set corresponding to a first slot of a downlink subframe is defined for the plurality of cells and information on a VRB set corresponding to a second slot of the downlink subframe is defined for the plurality of cells when the information on configuration of the VRB set is an information related to a plurality of cells for which PDCCH cross-interleaving is set or to a plurality of cells for which PDCCH demodulation based on a cell-specific reference signal is set.

13. The method according to claim 5, wherein the predetermined cell is a primary cell (PCell).

* * * * *